United States Patent
Nakamachi et al.

(10) Patent No.: US 6,485,804 B1
(45) Date of Patent: *Nov. 26, 2002

(54) POLYESTER COMPOSITIONS AND LAMINATES AND PROCESSES FOR PRODUCING BIAXIALLY STRETCHED POLYESTER BOTTLES

(75) Inventors: Koji Nakamachi, Yamaguchi (JP); Masahiro Kouya, Yamaguchi (JP); Shoji Hiraoka, Yamaguchi (JP)

(73) Assignee: Mitsui Petrochemical Industries, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,340
(22) PCT Filed: Feb. 18, 1997
(86) PCT No.: PCT/JP97/00427
§ 371 (c)(1), (2), (4) Date: Sep. 11, 1997
(87) PCT Pub. No.: WO97/31050
PCT Pub. Date: Aug. 28, 1997

(30) Foreign Application Priority Data

Feb. 21, 1996 (JP) .............................................. 8-033936
Apr. 18, 1996 (JP) .............................................. 8-096981
Aug. 6, 1996 (JP) .............................................. 8-206289

(51) Int. Cl.$^7$ ........................ B32B 27/06; B32B 27/08; B32B 27/36
(52) U.S. Cl. .................... 428/35.7; 428/36.6; 428/36.9; 428/36.91; 428/474.4; 428/475.2; 428/480; 428/483; 428/520; 428/542.8
(58) Field of Search ................................. 264/521, 533, 264/903; 428/35.7, 36.6, 36.9, 36.91, 474.4, 475.2, 480, 483, 520, 542.8; 525/444

(56) References Cited

U.S. PATENT DOCUMENTS

| | | | | |
|---|---|---|---|---|
| 4,127,631 A | * | 11/1978 | Dempsey et al. | 264/92 |
| 4,578,295 A | * | 3/1986 | Jabarin | 428/35 |
| 4,933,135 A | * | 6/1990 | Horwege et al. | 264/533 |
| 5,039,780 A | * | 8/1991 | Hashimoto et al. | 528/194 |
| 5,628,957 A | | 5/1997 | Collette et al. | 264/512 |
| 6,004,638 A | | 12/1999 | Kaya et al. | 428/35.7 |

FOREIGN PATENT DOCUMENTS

| | | | | |
|---|---|---|---|---|
| EP | 82221341 | | 2/1998 | B29B/11/08 |
| JP | 56159220 | | 12/1981 | C08G/63/16 |
| JP | 57-36123 | * | 2/1982 | C08G/63/66 |
| JP | 06-298918 | * | 10/1994 | C08G/63/668 |
| JP | 07-082389 | * | 3/1995 | C08J/5/18 |
| JP | 07-090066 | * | 4/1995 | C08G/63/189 |
| JP | 08-034842 | * | 2/1996 | C08G/63/668 |

* cited by examiner

Primary Examiner—Sandra M. Nolan
(74) Attorney, Agent, or Firm—Birch, Stewart, Kolasch & Birch, LLP

(57) ABSTRACT

The novel polyester (first polyester [A]) of the invention comprises dicarboxylic acid constituent units derived from at least one dicarboxylic acid selected from terephthalic acid, isophthalic acid and naphthalenedicarboxylic acid and diol constituent units derived from diols comprising ethylene glycol and a polyalkylene glycol having a $C_2$–$C_{10}$ alkylene chain, wherein the proportion of constituent units derived from the polyalkylene glycol is 0.001 to 10% by weight based on the diol constituent units. The polyester [A] has an excellent crystallization rate, is suitably used, singly or as compositions together with another polyester [B] and/or other polymers, for production of molded products such as films, sheets, laminates, preforms and bottles, which have excellent thermal, gas barrier and transparency properties.

36 Claims, No Drawings

POLYESTER COMPOSITIONS AND LAMINATES AND PROCESSES FOR PRODUCING BIAXIALLY STRETCHED POLYESTER BOTTLES

TECHNICAL FIELD

The present invention relates to novel polyesters, polyester compositions, polyester laminates and processes for producing biaxially oriented polyester bottles. More particularly, the invention relates to polyesters and polyester compositions, which have excellent high crystallization rate, gas barrier properties, transparency and heat resistance, and also relates to preforms, biaxially oriented bottles and laminates, which are produced from the polyesters, and to processes for producing biaxially oriented polyester bottles having excellent gas barrier properties, transparency and heat resistance.

BACKGROUND ART

Because of their excellent gas barrier properties, transparency and mechanical strength, saturated polyesters such as polyethylene terephthalate are widely used for containers such as bottles. Particularly, the bottles obtained by biaxial orientation blow molding of polyethylene terephthalate are excellent in transparency, mechanical strength, heat resistance and gas barrier properties, so that they have been extensively used for containers (PET bottles) to be filled with drinks such as juice, soft drinks and carbonated beverages. These bottles are generally produced by a process comprising the steps of molding saturated polyester to give a preform having a neck and a body, then inserting the preform in a mold of given shape, and subjecting the body of the preform to stretch blow molding, thereby producing bottles each having a neck and a stretched body.

The polyester bottles, particularly polyester bottles for drinks such as juice, are required to have heat resistance high enough for heat sterilization of the contents. Therefore, the bottles are generally further subjected to heat treatment (heat setting) after the blow molding to improve the heat resistance.

However, the necks of the above-obtained polyester bottles are not stretched and are inferior to the bodies in the heat resistance. In general, therefore, the necks of the preforms are heat crystallized before blow molding, or the necks of the bottles obtained by blow molding are heat crystallized, whereby the mechanical resistance and the heat resistance of the necks are improved.

In recent years, the sizes of bottles produced from the polyester resins (particularly polyethylene terephthalate) tend to be made smaller. In case of the small-sized bottles, the content has an increased area in contact with the bottle body per unit volume of content, and hence remarkable loss of gas in the content or transmission of oxygen from the outside takes place to affect the content, resulting in decrease of shelf life of the content. Accordingly, development of polyester bottles having better gas barrier properties than the conventional ones is desired.

Recently, further, the time for producing bottles of polyester resins is desired to be shortened to improve the productivity. In order to shorten the time for producing bottles, it is effective to shorten the crystallization time of the necks or the heat-setting time of the bottle bodies.

However, shortening of the crystallization time of the necks or the heat-setting time of the bottle bodies generally causes decrease of mechanical strength or heat resistance of the resulting bottles. Therefore, in order to carry out crystallization of necks or heat-setting of bottle bodies for a short period of time, it is necessary to use polyesters having a high crystallization rate. As one example of the polyester having a high crystallization rate, a polyester resin composition composed of a virgin polyester and a repro-polyester is known. The term "virgin polyester" used herein means a polyester prepared from a dicarboxylic acid and a diol and has no history of being passed through a molding machine in a molten state to give any bottle or preform. The term "repro-polyester" used herein means a polyester obtained by passing the virgin polyester in a molten state through a molding machine at least once and pulverizing the resulting polyester molded product.

Although some polyester resin compositions have a high crystallization rate and are able to be heat crystallized for a short period of time, the resulting bottles have a problem of decrease in transparency.

Accordingly, it has been desired to develop polyesters capable of producing molded articles, such as bottles having excellent transparency and gas barrier properties. Also is desired development of preforms and biaxially stretched bottles and processes for producing biaxially stretched polyester bottles made of such polyesters.

OBJECT OF THE INVENTION

The present invention has been made under such circumstances as mentioned above, and it is an object of the invention to provide a polyester and a polyester composition both having a high crystallization rate and having excellent gas barrier properties, transparency and heat resistance.

It is another object of the invention to provide a preform made of the above-mentioned polyester and a biaxially stretched bottle and a polyester laminate both having excellent gas barrier properties, transparency and heat resistance.

It is a further object of the invention to provide a process for producing biaxially stretched polyester bottles, by which bottles of excellent gas barrier properties, transparency and heat resistance can be produced, and to provide a process for producing biaxially stetched polyester bottles, by which bottles of excellent gas barrier properties, transparency and heat resistance can be produced with high productivity.

DISCLOSURE OF THE INVENTION

The novel polyester according to the invention (first polyester [A]) is a polyester comprising:
dicarboxylic acid constituent units derived from at least one dicarboxylic acid selected from the group consisting of terephthalic acid, isophthalic acid and naphthalenedicarboxylic acid, and
diol constituent units derived from diols comprising ethylene. glycol and a polyalkylene glycol having an alkylene chain of 2 to 10 carbon atoms,
wherein the proportion of constituent units derived from the polyalkylene glycol is in the range of 0.001 to 10% by weight based on the diol constituent units.

The polyester composition according to the invention comprises:
1 to 99% by weight of the first polyester [A]; and
1 to 99% by weight of a second polyester [B] comprising dicarboxylic acid constituent units derived from at least one dicarboxylic acid selected from the group consisting of terephthalic acid, isophthalic acid and naphthalenedicarboxylic acid and diol constituent units derived from diols comprising ethylene glycol, wherein the proportion of constituent units derived from a polyalkylene glycol is less than 0.001% by weight based on the diol constituent units.

Each of the preform and the biaxially stretched bottle according to the invention comprises the first polyester [A].

The polyester laminate according to the invention has a multi-layer structure comprising:

[I] a first resin layer formed from the first polyester [A] or the polyester composition of the invention, and

[II] a second resin layer formed from at least one resin selected from the group consisting of (a) the second polyester [B], (b) a polyamide and (c) a polyolefin.

The process for producing biaxially stretched bottle according to the invention comprises the steps of producing a preform from the first polyester [A], the polyester composition or the polyester laminate, heating the preform, subjecting the preform to biaxial stretch blow molding to give a stretched bottle and holding the stretched bottle in a mold at a temperature of not lower than 100° C.

In the above process, the neck of the preform may be heat crystallized before the biaxial stretch blow molding, or the neck of the bottle may be heat crystallized after the biaxial stretch blow molding.

BEST MODE FOR CARRYING OUT THE INVENTION

The polyester (first polyester [A]), the preform and the biaxially stretched bottle made of the polyester, the polyester composition, the polyester laminate and the process for producing biaxially stretched polyester bottle according to the invention are described in detail hereinafter.

First Polyester [A]

The novel first polyester [A] according to the invention is a polyester comprising:

dicarboxylic acid constituent units derived from at least one dicarboxylic acid selected from the group consisting of terephthalic acid, isophthalic acid and naphthalenedicarboxylic acid, and diol constituent units derived from diols comprising ethylene glycol and polyalkylene glycol having an alkylene chain of 2 to 10 carbon atoms, wherein the proportion of constituent units derived from the polyalkylene glycol is in the range of 0.001 to 10% by weight based on the diol constituent units.

The dicarboxylic acid constituent units and the diol constituent units are described below.

Dicarboxylic Acid Constituent Unit in the First Polyester [A]

The dicarboxylic acid constituent units mainly contain constituent units derived from at least one dicarboxylic acid selected from the group consisting of terephthalic acid, isophthalic acid and naphthalenedicarboxylic acid or its ester derivative (e.g., lower alkyl ester, phenyl ester).

(1) In the first preferred embodiment of the invention, the dicarboxylic acid constituent units mainly contain constituent units derived from terephthalic acid or its ester derivative.

In the dicarboxylic acid constituent units, constituent units derived from dicarboxylic acids other than the terephthalic acid or its ester derivative may be contained in amounts of not more than 15% by mol.

Examples of the dicarboxylic acids other than the terephthalic acid include:

aromatic dicarboxylic acids, such as naphthalenedicarboxylic acid, diphenyldicarboxylic acid and diphenoxyethanedicarboxylic acid;

aliphatic dicarboxylic acids, such as succinic acid, glutaric acid, adipic acid, sebacic acid, azelaic acid and decanedicarboxylic acid; and alicyclic dicarboxylic acids, such as cyclohexanedicarboxylic acid.

Also employable are ester derivatives of the other dicarboxylic acids than the terephthalic acid. These dicarboxylic acids and their ester derivatives may be used singly or in combination.

(2) In the second preferred embodiment of the invention, the dicarboxylic acid constituent units mainly contain constituent units derived from terephthalic acid or its ester derivative, and contain constituent units derived from isophthalic acid or its ester derivative in the specific proportion.

It is desired that the constituent units derived from the isophthalic acid or its ester derivative are contained in amounts of 1 to 15% by weight, preferably 2 to 12% by weight, more preferably 4 to 10% by weight, based on the dicarboxylic acid constituent units. The first polyester containing the constituent units derived from the isophthalic acid in the amount of this range has excellent heat stability in the molding process and excellent gas barrier properties.

In the dicarboxylic acid constituent units, constituent units derived from dicarboxylic acids other than the terephthalic acid, the isophthalic acid or their ester derivatives may be contained in amounts of not more than 15% by mol.

Examples of the dicarboxylic acids other than the terephthalic acid and the isophthalic acid include:

aromatic dicarboxylic acids, such as o-phthalic acid, naphthalenedicarboxylic acid, diphenyldicarboxylic acid and diphenoxyethanedicarboxylic acid;

aliphatic dicarboxylic acids, such as succinic acid, glutaric acid, adipic acid, sebacic acid, azelaic acid and decanedicarboxylic acid; and alicyclic dicarboxylic acids, such as cyclohexanedicarboxylic acid.

Also employable are ester derivatives of the dicarboxylic acids other than the terephthalic acid and the isophthalic acid. These dicarboxylic acids and their ester derivatives may be used singly or in combination.

(3) In the third preferred embodiment of the invention, the dicarboxylic acid constituent units mainly contain constituent units derived from naphthalenedicarboxylic acid or its ester derivative, and optionally contain constituent units derived from terephthalic acid or isophthalic acid or its ester derivative.

It is desired that the constituent units derived from the-naphthalenedicarb6xylic acid or its ester derivative are contained in amounts of 55 to 100% by weight, preferably 75 to 100% by weight, more preferably 85 to 99% by weight, based on the dicarboxylic acid constituent units. The first polyester containing the constituent units derived from the naphthalenedicarboxylic acid in the amount of this range has excellent heat stability in the molding process and excellent gas barrier properties.

In the dicarboxylic acid constituent units, constituent units derived from dicarboxylic acids other than the naphthalenedicarboxylic acid, the terephthalic acid, the isophthalic acid or their ester derivatives may be contained in amounts of not more than 15% by mol.

Examples of the dicarboxylic acids other than the naphthalenedicarboxylic acid, the terephthalic acid and the isophthalic acid include:

aromatic dicarboxylic acids, such as o-phthalic acid, diphenyldicarboxylic acid and diphenoxyethanedicarboxylic acid;

aliphatic dicarboxylic acids, such as succinic acid, glutaric acid, adipic acid, sebacic acid, azelaic acid and decanedicarboxylic acid; and alicyclic dicarboxylic acids, such as cyclohexanedicarboxylic acid.

Also employable are ester derivatives of the dicarboxylic acids other than the naphthalenedicarboxylic acid, the terephthalic acid and the isophthalic acid. These dicarboxylic acids and their ester derivatives may be used singly or in combination.

Diol Constituent Unit in the First Polyester [A]

The diol constituent units mainly contain constituent units derived from ethylene glycol and contain constituent units derived from polyalkylene glycol having an alkylene chain of 2 to 10 carbon atoms in the specific proportion.

Polyalkylene Glycol

The polyalkylene glycol having an alkylene chain of 2 to 10 carbon atoms, which forms the diol constituent units, is polyalkylene glycol generally known. The polyalkylene glycols can be obtained by condensing an alkylene glycol of 2 to 10 carbon atoms by a known method.

The polyalkylene glycol desirably has a polymerization degree (n) of 5 to 50, preferably 10 to 45, and has a molecular weight of 100 to 10,000, preferably 200 to 5,000, particularly preferably 500 to 3,000.

Examples of the polyalkylene glycols include polyethylene glycol, polypropylene glycol, polytetramethylene glycol, polyheptamethylene glycol, polyhexamethylene glycol and polyoctamethylene glycol. Of these, particularly preferable is polytetramethylene glycol.

In the present invention, it is desired that the constituent units derived from the polyalkylene glycol in the first polyester are contained in amounts of 0.001 to 10% by weight, preferably 0.01 to 8% by weight, more preferably 0.1 to 6% by weight, particularly preferably 1 to 4% by weight, based on the diol constituent units.

If the amounts of the constituent units derived from the polyalkylene glycol are less than 0.001% by weight, the improvement in the gas barrier properties or the heat-up crystallization rate of the polyester might be insufficient. If the amounts thereof exceeds 10% by weight, the transparency, the heat stability and the gas barrier properties of the polyester might be insufficient.

Other Diols

The diol constituent units may contain constituent units derived from diols other than ethylene glycol and polyalkylene glycol having an alkylene chain of 2 to 10 carbon atoms in amounts of not more than 15% by mol.

Examples of the diols other than ethylene glycol and polyalkylene glycol include:

aliphatic glycols, such as diethylene glycol, triethylene glycol, tetraethylene glycol, trimethylene glycol (propanediol), butanediol, pentanediol, neopentyl glycol, hexamethylene glycol and dodecamethylene glycol;

alicyclic glycols, such as cyclohexanedimethanol; and aromatic diols, such as bisphenols and hydroquinone.

Also employable are ester derivatives of these diols. These diols and their ester derivatives may be used singly or in combination.

The first polyester [A] of the invention may optionally contain constituent units derived from polyfunctional compounds, such as trimellitic acid, pyromellitic acid, trimethylolethane, trimethylolpropane, trimethylolmethane and pentaerythritol in small amounts, e.g., not more than 2% by mol.

The first polyester [A] of the invention may be prepared from the above-mentioned dicarboxylic acid and diol by a known process. For example, the dicarboxylic acid and the diol are directly subjected to esterification reaction, or when an alkyl ester of the dicarboxylic acid is used, the ester and the diol are subjected to ester interchange reaction, and then the resulting ester is subjected to melt polycondensation reaction by heating the reaction mixture under reduced pressure to remove the excessive diol, thereby preparing the first polyester [A].

These reactions can be carried out in the presence of conventionally known catalysts. Examples of the ester interchange catalysts include compounds of magnesium, manganese, titanium, zinc, calcium and cobalt. Examples of the polycondensation catalysts include compounds of antimony, germanium and titanium.

The ester interchange catalyst or the polycondensation catalyst may be used in any amount, as far as the reactivity and the heat resistance of the polyester are not lowered.

In the polycondensation stage, phosphorus compounds may be added as stabilizers. Examples of the phosphorus compounds include phosphates, such as trimethyl phosphate, triethyl phosphate, tri-n-butyl phosphate, trioctyl phosphate and triphenyl phosphate; phosphites, such as triphenyl phosphite, trisdodecyl phosphite and trisnonyl phosphite; acid phosphates, such as methyl acid phosphate, isopropyl acid phosphate, butyl acid phosphate, dibutyl phosphate, monobutyl phosphate and dioctyl phosphate; and other phosphorus compounds, such as phosphoric acid and polyphosphoric acid.

In the polycondensation reaction, the polycondensation catalyst is desirably used in an amount of 0.005 to 0.2% by mol, preferably 0.001 to 0.1% by mol, in terms of the metal atom in the catalyst, based on the dicarboxylic acid.

The first polyester [A] thus obtained has an intrinsic viscosity [IV] of 0.40 to 1.0 dl/g, preferably 0.50 to 0.90 dl/g.

The first polyester [A] obtained by the polycondensation reaction is generally melt-extruded into granules (chips).

The first polyester [A] obtained by the polycondensation reaction can be further subjected to solid phase polycondensation reaction. For example, the polyester chips obtained as above can be polymerized in a solid phase at a temperature of not lower than 160° C. and lower than the melting point thereof, preferably 170 to 220° C., for 8 to 40 hours, preferably 15 to 30 hours.

The process for preparing the first polyester [A] including the esterification step and the polycondensation step can be carried out batchwise or semi-continuously.

The first polyester [A] is substantially linear, and this can be confirmed by the fact that the first polyester [A] is dissolved in o-chlorophenol.

The first polyester [A] of the invention has an intrinsic viscosity [IV], as measured in o-chlorophenol at 25° C., of usually 0.3 to 1.5 dl/g, preferably 0.5 to 1.5 dl/g.

It is desirable that the first polyester [A] of the invention has a heat-up half crystallization time of 10 to 200 seconds, preferably 20 to 120 seconds. The heat-up half crystallization time is measured by the later-described method.

To the first polyester [A], various additives which are generally added to polyesters, such as colorants, antioxidants, ultraviolet light absorbers, antistatic agents, flame retarders and lubricants, may be added, if necessary.

The first polyester [A] of the invention can be used as a molding material for various molded products such as preforms, bottles and (stretched) films.

The first polyester [A] of the invention has a high crystallization rate. In the production of bottles, therefore, it is possible to shorten the time for the heat crystallization of necks of preforms or necks of bottles, and hence bottles having necks of excellent mechanical strength and heat resistance can be efficiently produced.

Preform and Bottle

The preform according to the invention can be obtained by, for example, injection molding or extrusion molding of the first polyester [A].

The bottle according to the invention can be obtained by biaxial stretch blow molding of the preform and then heat setting of the resulting molded product. In the preparation of the bottle, a neck of a preform may be heat crystallized and then the preform may be subjected to biaxial stretch blow molding, or a preform, prior to heat crystallization of its neck, may be subjected to biaxial stretch blow molding and then the neck of the bottle may be heat crystallized.

It is desirable that the bottle of the invention has a carbon dioxide gas transmission rate at its body of generally not more than 17.5 cc·mm/m$^2$·day·atm, preferably not more than 15 cc·mm/m$^2$·day·atm, more preferably not more than 4.0·cc·mm/m$^2$·day·atm.

In particular, when the bottle is made of the first polyester [A] in which the diarboxylic acid constituent units contain mainly constituent units derived from terephthalic acid or its ester derivative, the carbon dioxide gas transmission rate is preferably not more than 17.5 cc·mm/m$^2$·day·atm.

When the bottle is made of the first polyester [A] in which the dicarboxylic acid constituent units contain mainly constituent units derived from terephthalic acid or its ester derivative and further contain constituent units derived from isophthalic acid or its ester derivative in the specific amount, the carbon dioxide gas transmission rate is preferably not more than 15 cc·mm/m$^2$·day·atm.

When the bottle is made of the first polyester [A] in which the dicarboxylic acid constituent units contain mainly constituent units derived from naphthalenedicarboxylic acid or its ester derivative and further contain constituent units derived from terephthalic acid or isophthalic acid or its ester derivative in the specific amount, the carbon dioxide gas transmission rate is preferably not more than 4.0 cc·mm/m$^2$·day·atm.

Polyester Composition

Next, the polyester composition according to the invention is described.

The polyester composition of the invention comprises:

1 to 99% by weight of the first polyester [A] comprising dicarboxylic acid constituent units derived from at least one dicarboxylic acid selected from the group consisting of terephthalic acid, isophthalic acid and naphthalenedicarboxylic acid and diol constituent units derived from diols comprising ethylene glycol and polyalkylene glycol having an alkylene chain of 2 to 10 carbon atoms, wherein the proportion of constituent units derived from the polyalkylene glycol is in the range of 0.001 to 10% by weight based on the diol constituent units; and 1 to 99% by weight of a second polyester [B] comprising dicarboxylic acid constituent units derived from at least one dicarboxylic acid selected from the group consisting of terephthalic acid, isophthalic acid and naphthalenedicarboxylic acid and diol constituent units derived from diols comprising ethylene glycol, wherein the proportion of constituent units derived from a polyalkylene glycol is less than 0.001% by weight based on the diol constituent units.

First Polyester [A]

The first polyester [A] as described above can be used herein.

Second Polyester [B]

The second polyester [B] is described below.

The second polyester [B] comprises dicarboxylic acid constituent units derived from at least one dicarboxylic acid selected from the group consisting of terephthalic acid, isophthalic acid and naphthalenedicarboxylic acid and diol constituent units derived from diols comprising proportion of constituent units derived from a polyalkylene glycol is less than 0.001% by weight based on the diol constituent units.

Examples of the second polyester [B] are given below.

(i) Polyethylene terephthalate comprising dicarboxylic acid constituent units derived from a terephthalic acid or its ester derivative and diol constituent units derived from ethylene glycol.

In the polyethylene terephthalate (i), constituent units derived from other dicarboxylic acids and/or other diols may be contained in amounts of less than 20% by mol.

Examples of the other dicarboxylic acids include aromatic dicarboxylic acids, such as isophthalic acid, o-phthalic acid, diphenyldicarboxylic acid and diphenoxyethanedicarboxylic acid; aliphatic dicarboxylic acids, such as sebacic acid, azelaic acid and decanedicarboxylic acid; and alicyclic dicarboxylic acids, such as cyclohexanedicarboxylic acid.

Examples of the other diols include aliphatic glycols, such as diethylene glycol, trimethylene glycol, propylene glycol, tetramethylene glycol, hexamethylene glycol, dodecamethylene glycol and polyalkylene glycols; alicyclic glycols, such as cyclohexanedimethanol; bisphenols; and aromatic diols, such as hydroquinone and 2,2-bis(4-β-hydroxyethoxyphenyl)propane.

(ii) Polyethylene naphthalate comprising dicarboxylic acid constituent units derived from naphthalenedicarboxylic acid or its ester derivative and diol constituent units derived from ethylene glycol.

In the polyethylene naphthalate (ii), constituent units derived from other dicarboxylic acids and/or other diols may be contained in amounts of less than 40% by mol.

Examples of the other dicarboxylic acids include aromatic dicarboxylic acids, such as terephthalic acid, isophthalic acid, diphenyldicarboxylic acid, diphenyletherdicarboxylic acid, diphenoxyethanedicarboxylic acid and dibromoterephthalic acid; aliphatic dicarboxylic acids, such as adipic acid, azelaic acid, sebacic acid and decanedicarboxylic acid; alicyclic dicarboxylic acids, such as 1,4-cyclohexanedicarboxylic acid, cyclopropanedicarboxylic acid and hexahydroterephthalic acid; and hydroxycarboxylic acids, such as glycolic acid, p-hydroxybenzoic acid and p-hydroxyethoxybenzoic acid.

Examples of the other diols include propylene glycol, trimethylene glycol, diethylene glycol, tetramethylene glycol, pentamethylene glycol, hexamethylene glycol, decamethylene glycol, neopentylene glycol, polyalkylene glycols, p-xylene glycol, 1,4-cyclohexanedimethanol, bisphenol A, p,p-diphenoxysulfone, 1,4-bis(β-hydroxethoxy)benzene, 2,2-bis(p-β-hydroxyethoxyphenol) propane, p-phenylenebis(dimethylsiloxane) and glycerol.

(iii) Copolymerized polyester comprising dicarboxylic acid constituent units and diol constituent units derived from ethylene glycol, wherein the dicarboxylic acid constituent units mainly contain constituent units derived from terephthalic acid or its ester derivative and further contain constituent units derived from isophthalic acid or its ester derivative in the specific proportion.

It is desired that the constituent units derived from the isophthalic acid or its ester derivative are contained in amounts of 0.5 to 15% by mol, preferably 0.5 to 10% by mol, based on the dicarboxylic acid constituent units in the copolymerized polyester (iii).

(iv) Copolymerized polyester comprising dicarboxylic acid constituent units and diol constituent units derived from ethylene glycol, wherein the dicarboxylic acid constituent units mainly contain constituent units derived from terephthalic acid or its ester derivative and further contain constituent units derived from naphthalenedicarboxylic acid or its ester derivative in the specific proportion.

It is desired that the constituent units derived from the naphthalenedicarboxylic acid or its ester derivative are contained in amounts of 0.5 to 20% by mol, preferably 0.5 to 10% by mol, based on the dicarboxylic acid constituent units in the copolymerized polyester (iv).

(v) Copolymerized polyester comprising dicarboxylic acid constituent units and diol constituent units derived from ethylene glycol, wherein the dicarboxylic acid constituent units mainly contain constituent units derived from terephthalic acid or its ester derivative and further contain constituent units derived from adipic acid or its ester derivative in the specific proportion.

It is desired that the constituent units derived from the adipic acid or its ester derivative are contained in amounts of 0.5 to 15% by mol, preferably 0.5 to 10% by mol, based on the dicarboxylic acid constituent units in the copolymer polyester (v).

(vi) Copolymerized polyester comprising dicarboxylic acid constituent units derived from terephthalic acid or its ester derivative and diol constituent units, wherein the diol constituent units mainly contain constituent units derived from ethylene glycol and further contain constituent units derived from diethylene glycol in the specific proportion.

It is desired that the constituent units derived from the diethylene glycol are contained in amounts of 0.5 to 5% by weight, preferably 1.0 to 3.0% by weight, based on the diol constituent units in the copolymer polyester (vi).

(vii) Copolymerized polyester comprising dicarboxylic acid constituent units derived from terephthalic acid or its ester derivative and diol constituent units, wherein the diol constituent units mainly contain constituent units derived from ethylene glycol and further contain constituent units derived from neopentyl glycol in the specific proportion.

It is desired that the constituent units derived from the neopentyl glycol are contained in amounts of 1 to 30% by weight, preferably 5 to 15% by weight, based on the diol constituent units in the copolymerized polyester (vii).

(viii) Copolymerized polyester comprising dicarboxylic acid constituent units derived from terephthalic acid or its ester derivative and diol constituent units, wherein the diol constituent units mainly contain constituent units derived from ethylene glycol and further contain constituent units derived from cyclohexanedimethanol in the specific proportion.

It is desired that the constituent units derived from the cyclohexanedimethanol are contained in amounts of 1 to 30% by weight, preferably 5 to 15% by weight, based on the diol constituent units in the copolymerized polyester (viii).

(ix) Copolymerized polyester comprising:
dicarboxylic acid constituent units mainly containing constituent units derived from isophthalic acid or its ester derivative and optionally containing constituent units derived from terephthalic acid or its ester derivative in the specific proportion, and
diol constituent units containing constituent units derived from dihydroxyethoxyresol and constituent units derived from ethylene glycol.

It is desired that the constituent units derived from the isophthalic acid are contained in amounts of 20 to 100% by weight, preferably 50 to 98% by weight, based on the dicarboxylic acid constituent units in the copolymerized polyester (ix).

It is also desired that the constituent units derived from the dihydroxyethoxyresol are contained in amounts of 5 to 90% by mol, preferably 10 to 85% by mol, based on the diol constituent units in the copolymerized polyester (ix).

In the copolymerized polyester (ix), further, constituent units derived from a polyfunctional hydroxyl compound having at least three hydroxyl groups are desirably present in amounts of 0.05 to 1.0 part by mol, preferably 0.1 to 0.5 part by mol, based on 100 parts by mol of the dicarboxylic acid constituent units.

In the copolymerized polyesters (iii) to (ix), constituent units derived from other dicarboxylic acids and/or other diols than the above-mentioned dicarboxylic acids and diols may be contained in such amounts that the properties of the copolymer polyesters (iii) to (ix) are not marred, for example, in amounts of not more than 1% by mol.

Examples of the other dicarboxylic acids include o-phthalic acid and 2-methylterephthalic acid. Examples of the other diols include 1,3-propanediol, 1,4-butanediol, cyclohexanedimethanol, 1,3-bis(2-hydroxyethoxy)benzene, 1,4-bis(2-hydroxyethoxy)benzene, 2,2-bis(4-β-hydroxyethoxyphenyl)propane and bis(4-β-hydroxyethoxyphenyl)sulfone.

In the second polyester [B] used in the invention, constituent units derived from polyfunctional compounds, such as trimellitic acid, trimethylolethane, trimethylolpropane, trimethylolmethane and pentaerythritol, may be contained in small amounts, e.g., not more than 2% by mol.

In the second polyester [B], further, constituent units derived from monofunctional compounds, such as benzoylbenzoic acid, diphenylsulfonemonocarboxylic acid, stearic acid, methoxypolyethylene glycol and phenoxypolyethylene glycol, may be contained in amounts of not more than 2% by mol.

The heat-up crystallizing temperature (Tc) of the second polyester [B], as measured by means of a differential scanning calorimeter (DSC) in which a sample is heated at a rate of 10° C./min, is desired to be not lower than 150° C., preferably 160 to 230° C., more preferably 170 to 220° C.

The heat-up crystallizing temperature (Tc) of the polyesters described herein can be measured in the following manner. About 10 mg of a sample flake is cut from the center part of a saturated polyester resin chip having been dried at about 140° C. under a pressure of about 5 mmHg for not less than 5 hours. The sample is sealed in an aluminum pan for liquid in a nitrogen atmosphere. Using a differential scanning calorimeter molded DSC-2 produced by perkin Elmer Co., the measurement is caried out under the conditions such that the sample is rapidly heated from room temperature to 290° C., at which the sample is kept in a molten state, for 10 minutes, and then rapidly cooled to room temperature, and thereafter heated again at a rate of 10° C./min to detect exothermic peaks. The maximum peak temperature of these exothermic peaks is taken as the heat-up crystallizing temperature (Tc).

The second polyester [B] has an intrinsic viscosity [IV], as measured in o-chlorophenol at 25° C., of usually 0.5 to 1.5 dl/g, preferably 0.6 to 1.2 dl/g.

The second polyester [B] can be prepared by a process conventionally known.

The second polyester [B] may be used singly or as a blend of two or more of such polyesters. Examples of blends of polyesters include those of the polyethylene terephthalate (i) and the polyethylene naphthalate (ii), the polyethylene terephthalate (i) and at least one of the copolymerized polyesters (iii) to (ix), and at least two of the copolymerized polyesters (iii) to (ix).

Of the blends, preferably used are a blend of the polyethylene terephthalate (i) and the copolymer polyester (iii) and a blend of the polyethylene terephthalate (i) and the copolymer polyester (ix).

The polyester composition of the invention comprises:

the first polyester [A] in an amount of 1 to 99% by weight, preferably 1 to 50% by weight, more preferably 2 to 25% by weight, and the second polyester [B] in an amount of 99 to 1% by weight, preferably 99 to 50% by weight, more preferably 98 to 75% by weight.

When the polyester composition contains the first polyester [A] in the amount of the above range, the composition exhibits sufficiently improved gas barrier properties and heat-up crystallization rate without decreasing the heat stability in the molding process.

The polyester composition of the invention desirably has a heat-up half crystallization time of 10 to 400 seconds, preferably 60 to 300 seconds. The heat-up half crystallization time is measured by the later-described method.

The polyester composition of the invention can be prepared from the first polyester [A] and the second polyester [B] by any process.

For example, the first polyester [A] and the second polyester [B] are directly blended by a blending machine such as a tumbling blender or a Henschel mixer.

Alternatively, the first polyester [A] and the second polyester [B] are previously melt kneaded to prepare a master batch containing the first polyester [A] in a high concentration, then the second polyester [B] is appropriately added to the master batch.

To the polyester composition of the invention, various additives which are generally added to polyesters, such as colorants, antioxidants, ultraviolet light absorbers, antistatic agents, flame retarders and lubricants, may be added, if necessary. These additives may be added to the polyester composition as a master batch previously prepared from the additives and the polyester composition.

The polyester composition of the invention can be used as a molding material for various molded products such as preforms, bottles, (stretched) films and sheets for the good transparency and the superior gas barrier property.

The polyester composition of the invention has a high crystallization rate. In the production of bottles, therefore, it is possible to shorten the time for the heat crystallization of necks of preforms or necks of bottles, and hence bottles having necks of excellent mechanical strength and heat resistance can be efficiently produced.

Polyester Laminate

The polyester laminate according to the invention has a multi-layer structure comprising:

[I] a first resin layer formed from the first polyester [A] or the polyester composition of the invention, and

[II] a second resin layer formed from at least one resin selected from the group consisting of (a) the second polyester [B], (b) a polyamide and (c) a polyolefin.

Second Resin Layer

The second resin layer is formed from at least one resin selected from the group consisting of (a) the second polyester [B], (b) a polyamide and (c) a polyolefin.

Each resin is described below.

(a) Second Polyester [B]

The second polyester [B] as described above in the polyester composition can be used herein.

(b) Polyamide

Examples of the polyamide (b) include aliphatic polyamides, such as nylon 6, nylon 66, nylon 10, nylon 12 and nylon 46, and aromatic polyamides prepared from aromatic dicarboxylic acids and aliphatic diamines. Of these, particularly preferable is nylon 6. These polyamides may be used singly or in combination.

These polyamides can be prepared by conventional processes.

(c) Polyolefin

Examples of the polyolefin (c) include olefin homopolymers, such as polyethylene, polypropylene, poly-1-butene, polymethylpentene, polymethylbutene, and olefin copolymers, such as propylene/ethylene random copolymer. Of these, particularly preferable are polyethylene and polypropylene. These polyolefins may be used singly or in combination.

These polyolefins can be prepared by conventional processes.

In the present invention, the second resin layer may be formed from a blend of the above resins (a) to (c).

The first resin layer and the second resin layer may contain various additives which are generally added to resin layers, such as colorants, antioxidants, ultraviolet light absorbers, antistatic agents, flame retarders and lubricants, if necessary.

In the polyester laminate of the invention, the first resin layer and the second resin layer are laminated together. It is desirable that the proportion of the thickness of the first resin layer is preferably in the range of 5 to 30%, more preferably 5 to 20%, most preferably 5 to 15%, and that the proportion of the thickness of the second resin layer is preferably in the range of 70 to 95%, more preferably 80 to 95%, most preferably 85 to 95%, both based on the total thickness of the polyester laminate.

The polyester laminate of the invention may have a third layer in addition to the first and second resin layers. For example, third layer may be a layer made of a composition comprising the resin for forming the first resin layer and the resin for forming the second resin layer, or a layer containing additives such as heat stabilizers, weathering stabilizers, lubricants, dyes, pigments, anti-fogging agents and antistatic agents, wherein each of such layers may be provided on at least one surface of the polyester laminate, or may be provided as an intermediate layer between the first and the second resin layers; a layer for adhesive bonding the first resin layer to the second resin layer, such as a modified polyolefin layer; and further a layer made of glass, metal or paper.

The laminate of the invention can be prepared in accordance with conventional processes using the above-described resins.

The polyester which composes laminate of the invention has a high crystallization rate. In the production of bottles, therefore, it is possible to shorten the time for the heat crystallization of necks of preforms or necks of bottles, and hence bottles having necks of excellent mechanical strength and heat resistance can be efficiently produced.

When the polyester laminate of the invention is in the form of a preform or a bottle, its external layer is preferably the first resin layer.

When the polyester laminate of the invention is in the form of a bottle, the body of the bottle has a carbon dioxide gas transmission rate of not more than 17.5 cc·mm/$m^2$·day·atm, preferably 15.0 cc·mm/$m^2$·day·atm, more preferably 4.0 cc·mm/$m^2$·day·atm.

Process for Producing Biaxially Oriented Polyester Bottle

Next, the process for producing biaxially stretched polyester bottle according to the invention is described.

In the process for producing biaxially stretched polyester bottle according to the invention, a preform is produced from either the first polyester [A], the polyester composition or the polyester laminate, the preform is heated, is subjected to biaxial stretch blow molding, and the resulting stretched bottle is held in a mold at a temperature of not lower than 100° C.

The preform can be produced by a conventional molding method such as extrusion molding or injection molding.

The preform formed from the polyester laminate can be produced by, for example, subjecting the first polyester [A] or the plyester composition of the invention to form the first resin layer and the resin for forming the second resin layer to co-extrusion molding to form a multi-layer pipe and then providing a bottom at one end of the pipe and a neck at the other end of the pipe. Alternatively, the above-mentioned first layer resin or composition and the second layer resin can be subjected to co-injection molding, to form a multi-layer preform.

The external layer of the preform thus produced is preferably the first resin layer. The proportion of the thickness of the first resin layer is in the range of preferably 5 to 30%, more preferably 5 to 20%, most preferably 5 to 15%, based on the total wall thickness of the preform. The proportion of the thickness of the second resin layer is in the range of preferably 70 to 95%, more preferably 80 to 95%, most preferably 85 to 95%, based on the total wall thickness of the preform. Since such preform can be stretched in a high stretch ratio in the production of bottle, the total length of the preform may be shorter than the conventional one, or the diameter of the preform may be smaller than the conventional one.

In the above process, the temperature for heating the preform is desirably in the range of 70 to 150° C., preferably 80 to 140° C. The preform can be heated from the outside and the inside (hollow part). As the heat source, infrared rays and the like are employable. The heating from the hollow part is preferably carried out simultaneously with heating from the outside.

In the biaxial stretch blow molding, the stretch ratio is 6 to 15 times, preferably 7 to 12 times, in terms of the area stretch ratio (lengthwise stretch ratio×crosswise stretch ratio).

In the present invention, the biaxially stretched bottle may be further subjected to heat setting. The heat setting is desirably carried out by holding the oriented bottle in a mold at a mold temperature of 100 to 240° C., preferably 110 to 220° C., particularly preferably 140 to 210° C., for a period of not less than 1 second, preferably not less than 3 seconds. By virtue of heat setting, the heat resistance and the gas barrier properties of the stretched bottle are improved.

In the present invention, the neck of the preform may be heat crystallized before the biaxial stretch blow molding, or the neck of the bottle may be heat crystallized after the biaxial stretch blow molding.

The heat crystallization of the neck of the preform or the neck of the bottle can be carried out at a temperature of 100 to 200° C., preferably 120 to 180° C. It is desired that the heat crystallization is carried out so that the neck of the preform or the neck of the bottle has a crystallinity of 25 to 60%, preferably 25 to 50%.

The body of the biaxially stretched polyester bottle has a carbon dioxide gas transmission rate of usually not more than 17.5 cc·mm/$m^2$·day·atm, preferably 15.0 cc·mm/$m^2$·day·atm, more preferably 4.0 cc·mm/$m^2$·day·atm. The biaxially stretched polyester bottle has a haze of usually 1.0 to 20%, preferably 5 to 15%.

According to the process of the invention, the transparency of the bottle body is hardly harmed, and hence a biaxially stretched polyester bottle having excellent transparency, gas barrier properties and heat resistance can be produced.

According to the process of the invention, further, heat crystallization of a neck of the preform or a neck of the bottle can be carried out at a high speed, so that a bottle molding cycle including heat crystallization of neck can be shortened, and a biaxially stretched polyester bottle having excellent transparency, gas barrier properties and heat resistance can be produced with high productivity.

EFFECT OF THE INVENTION

The novel polyester and the polyester composition according to the invention show a high crystallization rate and have excellent gas barrier properties, transparency and heat resistance.

The preform and the bottle according to the invention have excellent gas barrier properties, transparency and heat resistance.

The polyester laminate according to the invention has excellent gas barrier properties, transparency and heat resistance. The polyester laminate is suitable for bottles and preforms.

Bottles, sheets and films formed from the novel polyester, the polyester composition and the polyester laminate according to the invention are suitable for bottles for soft drinks such as water, juice, cola and carbonated beverages, bottles for flavoring materials such as soy sauce, Worcester sauce and catsup, bottles for liquors such as wine, sake and whisky, packaging or keeping sheets for dairy products such as butter and cheese, meat and fish, tanks for agricultural chemicals or gasoline, and packaging films for medicines.

According to the process of the invention, biaxially stretched polyester bottles showing excellent gas barrier properties, transparency and heat resistance and having high mechanical strength and heat resistance at their necks can be produced with high productivity.

EXAMPLE

The present invention will be further described with reference to the following examples, but it should be construed that the invention is in no way limited to those examples.

In the following examples, the properties were measured in accordance with the below-described methods.

Intrinsic Viscosity [IV]

A sample solution of 8 g/dl was prepared by dissolving it in o-chlorophenol as solvent and was measured for a solution viscosity at 25° C. From the solution viscosity, the intrinsic viscosity was calculated.

Carbon Dioxide Gas Transmission Rate (Gas Barrier Properties)

The carbon dioxide gas transmission rate was measured under the conditions of a temperature of 23° C. and a relative humidity of 60% by means of a gas transmission rate measuring device GPM-250 manufactured by G.L. Science K.K.

The films used in the measurement were produced in the following manner.

Oriented film (2): A film 0.1 mm in thickness was produced by means of a press molding machine at a mold temperature of 290° C., and the film was rapidly cooled at a cooling mold temperature of 0° C. to give an amorphous film (1). The amorphous film (1) was stretched biaxially at the same time in a stretch ratio of 3 times in each direction at a temperature higher by 15° C. than the glass transition temperature (Tg) of the polyester for forming the amorphous film, to give a stretched film (2).

Heat-set film (3): The stretched film (2) was mounted on a metal mount, and heat setting was carried out at 150° C. for 3 minutes in an oven to give a heat-set film (3).

Heat-set bottle (4): A preform was produced by means of an injection molding machine under the conditions of a cylinder temperature of 280° C. and a mold temperature of 10° C. Then, the preform was subjected to biaxial stretch blow molding first in a lengthwise stretch ratio of 3 times and then in a crosswise stretch ratio of 3 times at a temperature higher by 15° C. than Tg of the polyester of the preform, to produce a bottle. The body of the bottle was heat set at 200° C. for 1 minute to obtain a stretch heat-set bottle (4). The body of the heat-set bottle (4) was cut to give a specimen.

Transparency (Haze)

A dry polymer was molded into a square plate 5 mm in thickness by means of an injection molding machine under the conditions of a cylinder temperature of 280° C. and a mold temperature of 10° C. The transparency of the molded square plate was evaluated by measuring a haze value according to the method of ASTM D 1003.

Half Crystallization Time

The half crystallization time was measured by means of a differential scanning calorimeter (DSC) manufactured by Perkin Elmer Co.

A dry polymer of 10 mg was weighed and placed in a sample pan, heated at 290° C. for 5 minutes to melt it, then rapidly cooled to 50° C. at a cooling rate of 320° C./min and allowed to stand for 5 minutes, to prepare an amorphous sample. The sample was again heated to 140° C. at a heating rate of 320° C./min and maintained at this temperature. The sample was crystallized at this temperature to give a time exotherm curve, from which the total calorific value was obtained. The half crystallization time is defined as the time (second). taken to generate heat in an amount of ½ of the total calorific value.

As the polymer has a shorter half crystallization time, the crystallization of the polymer proceeds more efficiently and the productivity of bottle is increased.

The bottle obtained by the process for producing the heat-set bottle (4) was evaluated on the heat resistance and the appearance in accordance with the below-described methods.

Heat Resistance

A biaxially stretched bottle having an internal volume of 1.5 liters obtained as above was allowed to stand for 1 week under the conditions of a temperature of 40° C. and a humidity of 90%. The bottle was filled with hot water of 90° C. and held for 10 minutes. The internal volumes of the bottle before and after filling of hot water were measured.

From the internal volumes thus measured, a degree of shrinkage (%) was calculated by the following equation.

$$\text{Degree of shrinkage}(\%) = \frac{A(g) - B(g)}{A(g)} \times 100$$

A: internal volume before filling of hot water
B: internal volume after filling of hot water
The heat resistance was evaluated by the degree of shrinkage (%) based on the following criteria.
AA: 0≦degree of shrinkage (%)<0.5
BB: 0.5≦degree of shrinkage (%)

Appearance of Bottle

Haze of the side surface of a biaxially stretched bottle having an internal volume of 1.5 liters obtained as above was measured at the position 83 mm high from the bottom of the bottle.

The appearance of bottle was evaluated by the haze (%) based on the following criteria.
AA: 0≦haze (%)<5
BB: 5≦haze (%)

EXAMPLE 1

A polyester having an intrinsic viscosity [IV] of 0.775 dl/g was prepared in accordance with a conventional method by the use of 166 parts by weight of terephthalic acid (a-1), as a dicarboxylic acid component (a), and 68 parts by weight of ethylene glycol (b-1) and 1.9 parts by weight of polytetramethylene glycol (b-2) having an average molecular weight of 1,000, as diol components (b).

As for the polyester, haze, Tg, half crystallization time and carbon dioxide gas transmission rate were measured by the aforesaid methods. The results are set forth in Table 1.

EXAMPLE 2

A polyester having an intrinsic viscosity [IV] of 0.780 dl/g was obtained in the same manner as in Example 1, except that the polytetramethylene glycol (b-2) having an average molecular weight of 1,000 was replaced with polytetramethylene glycol (b-3) having an average molecular weight of 2,000.

As for the polyester, haze, Tg, half crystallization time and carbon dioxide gas transmission rate were measured by the aforesaid methods. The results are set forth in Table 1.

EXAMPLE 3

A polyester having an intrinsic viscosity [IV] of 0.778 dl/g was obtained in the same manner as in Example 1, except that the polytetramethylene glycol (b-2) having an average molecular weight of 1,000 was replaced with polytetramethylene glycol (b-4) having an average molecular weight of 2,900.

As for the polyester, haze, Tg, half crystallization time and carbon dioxide gas transmission rate were measured by the aforesaid methods. The results are set forth in Table 1.

COMPARATIVE EXAMPLE 1

A polyester having an intrinsic viscosity [IV] of 0.775 dl/g was obtained by the use of 166 parts by weight of terephthalic acid (a-1), as a dicarboxylic acid component (a), and 68 parts by weight of ethylene glycol (b-1), as a diol component (b).

As for the polyester, haze, Tg, half crystallization time and carbon dioxide gas transmission rate were measured by the aforesaid methods. The results are set forth in Table 1.

COMPARATIVE EXAMPLE 2

A polyester having an intrinsic viscosity [IV] of 0.776 dl/g was obtained by the use of 166 parts by weight of terephthalic acid (a-1), as a dicarboxylic acid component (a), and 68 parts by weight of ethylene glycol (b-1) and 8.5 parts by weight of polytetramethylene glycol (b-2) having an average molecular weight of 1,000, as diol components (b).

As for the polyester, haze, Tg, half crystallization time and carbon dioxide gas transmission rate were measured by the aforesaid methods. The results are set forth in Table 1.

TABLE 1 (I)

| | (a) Dicarboxylic acid constituent unit<br>(b) diol constituent unit | | Amount (part(s) by wt.) | Haze (%) | Tg (° C.) | Half crystallization time (sec.) |
|---|---|---|---|---|---|---|
| | Kind | | | | | |
| Ex. 1 | (a-1) | Terephthalic acid | 166 | 14.5 | 72 | 93 |
| | (b-1) | Ethylene glycol | 68 | | | |
| | (b-2) | Polytetramethylene glycol (Mw = 1000) | 1.9 | | | |
| Ex. 2 | (a-1) | Terephthalic acid | 166 | 17.4 | 71 | 92 |
| | (b-1) | Ethylene glycol | 68 | | | |
| | (b-3) | Polytetramethylene glycol (Mw = 2000) | 1.9 | | | |
| Ex. 3 | (a-1) | Terephthalic acid | 166 | 16.3 | 70 | 90 |
| | (b-1) | Ethylene glycol | 68 | | | |
| | (b-4) | Polytetramethylene glycol (Mw = 2900) | 1.9 | | | |
| Comp. Ex. 1 | (a-1) | Terephthalic acid | 166 | 9.4 | 76 | 202 |
| | (b-1) | Ethylene glycol | 68 | | | |
| Comp. Ex. 2 | (a-1) | Terephthalic acid | 166 | 25.6 | 59 | Unmeasurable |
| | (b-1) | Ethylene glycol | 68 | | | |
| | (b-2) | Polytetramethylene glycol (Mw = 1000) | 8.5 | | | |

TABLE 1 (II)

| | Carbon dioxide Gas transmission rate (cc · mm/m$^2$ · day · atom) | | | | |
|---|---|---|---|---|---|
| | Stretched film (2) | Heat-set film (3) | Heat-set bottle (4) | Heat resistance of bottle | Appearance of bottle |
| Ex. 1 | 16.8 | 15.1 | 13.0 | AA | AA |
| Ex. 2 | 18.8 | 16.2 | 14.4 | AA | AA |
| Ex. 3 | 19.2 | 16.8 | 14.2 | AA | AA |
| Comp. Ex. 1 | 22.8 | 18.0 | 15.4 | AA | AA |
| Comp. Ex. 2 | 25.6 | Unproducible | Unproducible | BB | BB |

EXAMPLE 4

A polyester having an intrinsic viscosity [IV] of 0.775 dl/g was obtained by the use of 148 parts by weight of terephthalic acid (a-1) and 16 parts by weight of isophthalic acid (a-2), as dicarboxylic acid components (a), and 68 parts by weight of ethylene glycol (b-1) and 1.9 parts by weight of polytetramethylene glycol (b-2) having an average molecular weight of 1,000, as diol components (b).

As for the polyester, haze, Tg, half crystallization time and carbon dioxide gas transmission rate were measured by the aforesaid methods. The results are set forth in Table 2.

EXAMPLE 5

A polyester having an intrinsic viscosity [IV] of 0.780 dl/g was obtained in the same manner as in Example 4, except that the polytetramethylene glycol (b-2) having an average molecular weight of 1,000 was replaced with polytetramethylene glycol (b-3) having an average molecular weight of 2,000.

As for the polyester, haze, Tg, half crystallization time and carbon dioxide gas transmission rate were measured by the aforesaid methods. The results are set forth in Table 2.

EXAMPLE 6

A polyester having an intrinsic viscosity [IV] of 0.778 dl/g was obtained in the same manner as in Example 4, except that the polytetramethylene glycol (b-2) having an average molecular weight of 1,000 was replaced with polytetramethylene glycol (b-4) having an average molecular weight of 2,900.

As for the polyester, haze, Tg, half crystallization time and carbon dioxide gas transmission rate were measured by the aforesaid methods. The results are set forth in Table 2.

EXAMPLE 7

A polyester having an intrinsic viscosity [IV] of 0.775 dl/g was obtained by the use of 158 parts by weight of terephthalic acid (a-1) and 8 parts by weight of isophthalic acid (a-2), as dicarboxylic acid components (a), and 68 parts by weight of ethylene glycol (b-1) and 1.9 parts by weight of polytetramethylene glycol (b-2) having an average molecular weight of 1,000, as diol components (b).

As for the polyester, haze, Tg, half crystallization time and carbon dioxide gas transmission rate were measured by the aforesaid methods. The results are set forth in Table 2.

COMPARATIVE EXAMPLE 3

A polyester having an intrinsic viscosity [IV] of 0.775 dl/g was obtained by the use of 133 parts by weight of terephthalic acid (a-1) and 33 parts by weight of isophthalic acid (a-2), as dicarboxylic acid components (a), and 68 parts by weight of ethylene glycol (b-1) and 1.9 parts by weight of polytetramethylene glycol (b-2) having an average molecular weight of 1,000, as diol components (b).

As for the polyester, haze, Tg, half crystallization time and carbon dioxide gas transmission rate were measured by the aforesaid methods. The results are set forth in Table 2.

TABLE 2 (I)

| | (a) Dicarboxylic acid constituent unit (b) diol constituent unit | | | | | Half crystallization time (sec.) |
|---|---|---|---|---|---|---|
| | Kind | | Amount (part(s) by wt.) | Haze (%) | Tg (° C.) | |
| Ex. 4 | (a-1) | Terephthalic acid | 148 | | | |
| | (a-2) | Isophthalic acid | 16 | | | |
| | (b-1) | Ethylene glycol | 68 | 7.2 | 68 | 301 |
| | (b-2) | Polytetramethylene glycol (Mw = 1000) | 1.9 | | | |
| Ex. 5 | (a-1) | Terephthalic acid | 148 | | | |
| | (a-2) | Isophthalic acid | 16 | | | |
| | (b-1) | Ethylene glycol | 68 | 8.7 | 67 | 295 |
| | (b-3) | Polytetramethylene glycol (Mw = 2000) | 1.9 | | | |
| Ex. 6 | (a-1) | Terephthalic acid | 148 | | | |
| | (a-2) | Isophthalic acid | 16 | | | |
| | (b-1) | Ethylene glycol | 68 | 8.2 | 66 | 289 |
| | (b-4) | Polytetramethylene glycol (Mw = 2900) | 1.9 | | | |
| Ex. 7 | (a-1) | Terephthalic acid | 158 | | | |
| | (a-2) | Isophthalic acid | 8 | | | |
| | (b-1) | Ethylene glycol | 68 | 10.8 | 70 | 198 |
| | (b-2) | Polytetramethylene glycol (Mw = 1000) | 1.9 | | | |
| Comp. Ex. 3 | (a-1) | Terephthalic acid | 133 | | | |
| | (a-2) | Isophthalic acid | 33 | | | |
| | (b-1) | Ethylene glycol | 68 | | | |
| | (b-2) | Polytetramethylene glycol (Mw = 1000) | 1.9 | | | |

TABLE 2 (II)

| | Carbon dioxide Gas transmission rate (cc · mm/m$^2$ · day · atom) | | | | |
|---|---|---|---|---|---|
| | Stretched film (2) | Heat-set film (3) | Heat-set bottle (4) | Heat resistance of bottle | Appearance of bottle |
| Ex. 4 | 11.3 | 11.0 | 9.87 | AA | AA |
| Ex. 5 | 12.6 | 11.8 | 10.9 | AA | AA |
| Ex. 6 | 12.9 | 12.2 | 10.8 | AA | AA |
| Ex. 7 | 14.0 | 13.0 | 11.4 | AA | AA |
| Comp. Ex. 3 | Unproducible | Unproducible | Unproducible | BB | BB |

EXAMPLE 8

A polyester [A-1] having an intrinsic viscosity [IV] of 0.643 dl/g was obtained by the use of 198 parts by weight of naphthalenedicarboxylic acid (a-3) and 16 parts by weight of isophthalic acid (a-2), as dicarboxylic acid components (a), and 68 parts by weight of ethylene glycol (b-1) and 1.9 parts by weight of polytetramethylene glycol (b-2) having an average molecular weight of 1,000, as diol components (b).

As for the polyester, haze, Tg, half crystallization time and carbon dioxide gas transmission rate were measured by the aforesaid methods. The results are set forth in Table 3.

EXAMPLE 9

A polyester [A-2] having an intrinsic viscosity [IV] of 0.648 dl/g was obtained in the same manner as in Example 8, except that the polytetramethylene glycol (b-2) having an average molecular weight of 1,000 was replaced with polytetramethylene glycol (b-3) having an average molecular weight of 2,000.

As for the polyester, haze, Tg, half crystallization time and carbon dioxide gas transmission rate were measured by the aforesaid methods. The results are set forth in Table 3.

EXAMPLE 10

A polyester having an intrinsic viscosity [IV] of 0.648 dl/g was obtained in the same manner as in Example 8, except that the polytetramethylene glycol (b-2) having an average molecular weight of 1,000 was replaced with polytetramethylene glycol (b-4) having an average molecular weight of 2,900.

As for the polyester, haze, Tg, half crystallization time and carbon dioxide gas transmission rate were measured by the aforesaid methods. The results are set forth in Table 3.

EXAMPLE 11

A polyester [A-3] having an intrinsic viscosity [IV] of 0.622 dl/g was obtained by the use of 206 parts by weight of naphthalenedicarboxylic acid (a-3) and 8 parts by weight of isophthalic acid (a-2), as dicarboxylic acid components (a), and 68 parts by weight of ethylene glycol (b-1) and 1.9 parts by weight of polytetramethylene glycol (b-2) having an average molecular weight of 1,000, as diol components (b).

As for the polyester, haze, Tg, half crystallization time and carbon dioxide gas transmission rate were measured by the aforesaid methods. The results are set forth in Table 3.

EXAMPLE 12

A polyester [A-4] having an intrinsic viscosity [IV] of 0.613 dl/g was obtained by the use of 214 parts by weight of naphthalenedicarboxylic acid (a-3), as a dicarboxylic acid component (a), and 68 parts by weight of ethylene glycol (b-1) and 1.9 parts by weight of polytetramethylene glycol (b-2) having an average molecular weight of 1,000, as diol components (b).

As for the polyester, haze, Tg, half crystallization time and carbon dioxide gas transmission rate were measured by the aforesaid methods. The results are set forth in Table 3.

COMPARATIVE EXAMPLE 4

A polyester having an intrinsic viscosity [IV] of 0.673 dl/g was obtained by the use of 214 parts by weight of naphthalenedicarboxylic acid (a-3), as a dicarboxylic acid component (a), and 68 parts by weight of ethylene glycol (b-1) and 8.5 parts by weight of polytetramethylene glycol (b-2) having an average molecular weight of 1,000, as diol components (b).

As for the polyester, haze, Tg, half crystallization time and carbon dioxide gas transmission rate were measured by the aforesaid methods. The results are set forth in Table 3.

COMPARATIVE EXAMPLE 5

A polyester having an intrinsic viscosity [IV] of 0.619 dl/g was obtained by the use of 214 parts by weight of naphthalenedicarboxylic acid (a-3), as a dicarboxylic acid component (a), and 68 parts by weight of ethylene glycol (b-1), as a diol component (b).

As for the polyester, haze, Tg, half crystallization time and carbon dioxide gas transmission rate were measured by the aforesaid methods. The results are set forth in Table 3.

TABLE 3 (I)

| | | (a) Dicarboxylic acid constituent unit (b) diol constituent unit | | | | |
|---|---|---|---|---|---|---|
| | | Kind | Amount (parts by wt.) | Haze (%) | Tg (C°) | Half-crystal-lization time (sec.) |
| Ex. 8 | (a-3) | Naphthalene-dicarboxylic acid | 198 | 3.6 | 111 | 290 |
| | (a-2) | Isophthalic acid | 16 | | | |
| | (b-1) | Ethylene glycol | 68 | | | |
| | (b-2) | Polytetramethylene glycol (Mw = 1000) | 1.9 | | | |
| Ex. 9 | (a-3) | Naphthalene-dicarboxylic acid | 198 | 3.9 | 110 | 278 |
| | (a-2) | Isophthalic acid | 16 | | | |
| | (b-1) | Ethylene glycol | 68 | | | |
| | (b-3) | Polytetramethylene glycol (Mw = 2000) | 1.9 | | | |
| Ex. 10 | (a-3) | Naphthalene-dicarboxylic acid | 198 | 4.2 | 109 | 275 |
| | (a-2) | Isophthalic acid | 16 | | | |
| | (b-1) | Ethylene glycol | 68 | | | |
| | (b-4) | Polytetramethylene glycol (Mw = 2900) | 1.9 | | | |
| Ex. 11 | (a-3) | Naphthalene-dicarboxylic acid | 206 | 5.1 | 113 | 186 |
| | (a-2) | Isophthalic acid | 8 | | | |
| | (b-1) | Ethylene glycol | 68 | | | |
| | (b-2) | Polytetramethylene glycol (Mw = 1000) | 1.9 | | | |
| Ex. 12 | (a-3) | Naphthalene-dicarboxylic acid | 214 | 7.5 | 115 | 192 |
| | (b-1) | Ethylene glycol | 68 | | | |
| | (b-2) | Polytetramethylene glycol (Mw = 1000) | 1.9 | | | |
| Comp. Ex. 4 | (a-3) | Naphthalene-dicarboxylic acid | 214 | 23.5 | 102 | 58 |
| | (b-1) | Ethylene glycol | 68 | | | |
| | (b-2) | Polytetramethylene glycol (Mw = 1000) | 8.5 | | | |
| Comp. Ex. 5 | (a-3) | Naphthalene-dicarboxylic acid | 214 | 7.6 | 120 | 450 |
| | (b-1) | Ethylene glycol | 68 | | | |

TABLE 3 (II)

| | Carbon dioxide Gas transmission rate (cc · mm/m² · day · atom) | | | | |
|---|---|---|---|---|---|
| | Stretched film (2) | Heat-set film (3) | Heat-set bottle (4) | Heat resistance of bottle | Appearance of bottle |
| Ex. 8 | 0.88 | 0.75 | 0.69 | AA | AA |
| Ex. 9 | 0.91 | 0.78 | 0.70 | AA | AA |
| Ex. 10 | 0.93 | 0.81 | 0.75 | AA | AA |
| Ex. 11 | 1.29 | 0.79 | 0.73 | AA | AA |
| Ex. 12 | 2.5 | 0.83 | 0.80 | AA | AA |
| Comp. Ex. 4 | 6.5 | 7.8 | 7.2 | AA | BB |
| Comp. Ex. 5 | 4.3 | 2.8 | 2.4 | AA | AA |

EXAMPLE 13

The polyester [A-1] of Example 8 as a first polyester and a second polyester [B-1] (polyethylene terephthalate, content of diethylene glycol: 1.95% by weight, intrinsic viscosity [IV]: 0.835 dl/g) were used in a weight ratio of 5:95 ([A-1]:[B-1]), to prepare a polyester composition. The polyester composition was melted and injection molded into a square plate, a film and a bottle in the manner described above. Then, haze, half crystallization time, carbon dioxide gas transmission rate, heat resistance and bottle appearance were evaluated by the aforesaid methods. The results are set forth in Table 4.

EXAMPLE 14

A polyester composition was prepared in the same manner as in Example 13, except that the weight ratio of [A-1] to [B-1] was varied to 10:90. Then, the properties were evaluated by the aforesaid methods. The results are set forth in Table 4.

EXAMPLE 15

A polyester composition was prepared in the same manner as in Example 13, except that the weight ratio of [A-1] to [B-1] was varied to 15:85. Then, the properties were evaluated by the aforesaid methods. The results are set forth in Table 4.

EXAMPLE 16

A polyester composition was prepared in the same manner as in Example 13, except that the polyester [A-2] of Example 9 was used in place of the polyester [A-1]. Then, the properties were evaluated by the aforesaid methods. The results are set forth in Table 4.

EXAMPLE 17

A polyester composition was prepared in the same manner as in Example 13, except that the polyester [A-2] was used in place of the polyester [A-1] and the weight ratio of [A-2] to [B-1] was made 10:90. Then, the properties were evaluated by the aforesaid methods. The results are set forth in Table 4.

EXAMPLE 18

A polyester composition was prepared in the same manner as in Example 13, except that the polyester [A-2] was used in place of the polyester [A-1] and the weight ratio of [A-2] to [B-1] was made 15:85. Then, the properties were evaluated by the aforesaid methods. The results are set forth in Table 4.

EXAMPLE 19

A polyester composition was prepared in the same manner as in Example 13, except that the polyester [A-3] of Example 11 was used in place of the polyester [A-1]. Then, the properties were evaluated by the aforesaid methods. The results are set forth in Table 4.

EXAMPLE 20

A polyester composition was prepared in the same manner as in Example 13, except that the polyester [A-3] was used in place of the polyester [A-1] and the weight ratio of [A-3] to [B-1] was made 10:90. Then, the properties were evaluated by the aforesaid methods. The results are set forth in Table 4.

EXAMPLE 21

A polyester composition was prepared in the same manner as in Example 13, except that the polyester [A-4] of Example 12 was used in place of the polyester [A-1] and the weight ratio of [A-4] to [B-1] was made 10:90. Then, the properties were evaluated by the aforesaid methods. The results are set forth in Table 4.

COMPARATIVE EXAMPLE 6

The second polyester [B-1] was melted and injection molded into a square plate, a film and a bottle in the manner described above. Then, haze, half crystallization time, carbon dioxide gas transmission rate, heat resistance and bottle appearance were evaluated by the aforesaid methods. The results are set forth in Table 4.

COMPARATIVE EXAMPLE 7

A polyester composition was prepared in the same manner as in Example 13, except that a second polyester [B-2] (polyethylene terephthalate, content of diethylene glycol: 1.33% by weight, intrinsic viscosity [IV]:0.775 dl/g) was used in place of the polyester [A-1] and the weight ratio of [B-2] to [B-1] was made 20:80. Then, the properties were evaluated by the aforesaid methods. The results are set forth in Table 4.

lengthwise stretch ratio of 3 times and then in a crosswise stretch ratio of 3 times by the use of a biaxial stretch blow molding machine at a blow pressure of 25 kg/cm², to produce a bottle. The body of the bottle was subjected to heat setting at 150° C. for 1 minute.

The bottle was evaluated on the half crystallization time, carbon dioxide gas transmission rate, heat resistance and appearance by the aforesaid methods. The results are set forth in Table 5.

EXAMPLE 23

A bottle was produced in the same manner as in Example 22, except that a preform having the [A-1] layer 0.9 mm in thickness and the [B-1] layer 5.1 mm in thickness was produced. The bottle was evaluated by the aforesaid methods. The results are set forth in Table 5.

EXAMPLE 24

A bottle was produced in the same manner as in Example 22, except that the polyester [A-2] was used in place of the

TABLE 4

|  | [A] First polyester [B] Second polyester | Amount (pts. by wt.) | Haze (%) | Half crystal- lization time (Sec.) | Carbon dioxide gas transmission rate (cc·mm/m²·day·atom) | | | Heat resist- ance of bottle | Appear- ance of bottle |
|---|---|---|---|---|---|---|---|---|---|
|  |  |  |  |  | Orient- ed film (2) | Heat- set film (3) | Heat- set bottle (4) |  |  |
| Ex. 13 | [A-1] | 5 | 6.5 | 161 | 10.7 | 8.7 | 6.8 | AA | AA |
|  | [B-1] | 95 |  |  |  |  |  |  |  |
| Ex. 14 | [A-1] | 10 | 7.2 | 155 | 6.7 | 5.8 | 4.2 | AA | AA |
|  | [B-1] | 90 |  |  |  |  |  |  |  |
| Ex. 15 | [A-1] | 15 | 8.3 | 132 | 4.9 | 3.9 | 3.2 | AA | AA |
|  | [B-1] | 85 |  |  |  |  |  |  |  |
| Ex. 16 | [A-2] | 5 | 7.1 | 161 | 11.6 | 9.5 | 7.2 | AA | AA |
|  | [B-1] | 95 |  |  |  |  |  |  |  |
| Ex. 17 | [A-2] | 10 | 7.9 | 140 | 7.4 | 6.1 | 4.8 | AA | AA |
|  | [B-1] | 90 |  |  |  |  |  |  |  |
| Ex. 18 | [A-2] | 15 | 8.6 | 117 | 5.5 | 4.6 | 4.0 | AA | AA |
|  | [B-1] | 85 |  |  |  |  |  |  |  |
| Ex. 19 | [A-3] | 5 | 8.3 | 122 | 13.3 | 11.2 | 8.3 | AA | AA |
|  | [B-1] | 95 |  |  |  |  |  |  |  |
| Ex. 20 | [A-3] | 10 | 9.5 | 124 | 8.9 | 7.5 | 5.6 | AA | AA |
|  | [B-1] | 90 |  |  |  |  |  |  |  |
| Ex. 21 | [A-4] | 10 | 9.8 | 115 | 13.5 | 11.1 | 8.5 | AA | AA |
|  | [B-1] | 90 |  |  |  |  |  |  |  |
| Comp. Ex. 6 | [B-1] | 100 | 9.4 | 202 | 18.5 | 15.3 | 12.3 | BB | BB |
| Comp. Ex. 7 | [B-1] [B-2] | 80 20 | 17.8 | 156 | 18.8 | 16.1 | 12.4 | BB | BB |

EXAMPLE 22

The polyester [A-1] for forming the first resin layer and the polyester [B-1] (polyethylene terephthalate, content of diethylene glycol: 1.95% by weight, intrinsic viscosity [IV]: 0.835 dl/g) for forming the second resin layer were melted by an extrusion molding machine at a cylinder temperature of 280° C., and they were fed to a two-layer forming die to produce a pipe (total wall thickness: 6 mm) having a two-layer structure consisting of a layer of [A-1] (thickness: 0.6 mm) as the external layer and a layer of [B-1] (thickness: 5.4 mm) as the internal layer. The temperature of the cooling water was 50° C. The outer diameter of the pipe was 22 mm.

The resulting pipe was cut. One end of the pipe thus cut was melted by heating to provide a bottom and the other end was melted by heating to provide a neck. Thus, a preform having a whole length of 70 mm and a weight of 23 g was obtained.

The preform was heated at a temperature of 100 to 130° C. and subjected to biaxial stretch blow molding first in a polyester [A-1]. The bottle was evaluated by the aforesaid methods. The results are set forth in Table 5.

EXAMPLE 25

A bottle was produced in the same manner as in Example 22, except that the polyester [A-2] was used in place of the polyester [A-1] and a preform having the [A-2] layer 0.9 mm in thickness and the [B-1] layer 5.1 mm in thickness was produced. The bottle was evaluated by the aforesaid methods. The results are set forth in Table 5.

EXAMPLE 26

A bottle was produced in the same manner as in Example 22, except that the polyester [A-3] was used in place of the polyester [A-1]. The bottle was evaluated by the aforesaid methods. The results are set forth in Table 5.

EXAMPLE 27

A bottle was produced in the same manner as in Example 22, except that the polyester [A-3] was used in place of the polyester [A-1] and a preform having the [A-3] layer 0.9 mm in thickness and the [B-1] layer 5.1 mm in thickness was produced. The bottle was evaluated by the aforesaid methods. The results are set forth in Table 5.

EXAMPLE 28

A bottle was produced in the same manner as in Example 22, except that the polyester [A-4] was used in place of the polyester [A-1]. The bottle was evaluated by the aforesaid methods. The results are set forth in-Table 5.

EXAMPLE 29

A bottle was produced in the same manner as in Example 22, except that the polyester [A-4] was used in place of the polyester [A-1] and a preform having the [A-4] layer 0.9 mm in thickness and the [B-1] layer 5.1 mm in thickness was produced. The bottle was evaluated by the aforesaid methods. The results are set forth in Table 5.

COMPARATIVE EXAMPLE 8

A bottle was produced in the same manner as in Example 22, except that a preform having only the [B-1] layer 6 mm in thickness was produced without using the polyester [A-1]. The bottle was evaluated by the aforesaid methods. The results are set forth in Table 5.

TABLE 5

|  | Component | Layer structure (mm) | Half crystallization (sec.) | Carbon dioxide gas transmission rate (cc · mm/m$^2$ · day · atom) | Heat resistance of bottle | Appearance of bottle |
| --- | --- | --- | --- | --- | --- | --- |
| Ex. 22 | [A-1] | 0.6 | 185 | 10.2 | AA | AA |
|  | [B-1] | 5.4 |  |  |  |  |
| Ex. 23 | [A-1] | 0.9 | 162 | 6.5 | AA | AA |
|  | [B-1] | 5.1 |  |  |  |  |
| Ex. 24 | [A-2] | 0.6 | 179 | 11.3 | AA | AA |
|  | [B-1] | 5.4 |  |  |  |  |
| Ex. 25 | [A-2] | 0.9 | 158 | 7.5 | AA | AA |
|  | [B-1] | 5.1 |  |  |  |  |
| Ex. 26 | [A-2] | 0.6 | 163 | 12.9 | AA | AA |
|  | [B-1] | 5.4 |  |  |  |  |
| Ex. 27 | [A-3] | 0.9 | 151 | 8.7 | AA | AA |
|  | [B-1] | 5.1 |  |  |  |  |
| Ex. 28 | [A-4] | 0.6 | 154 | 13.5 | AA | AA |
|  | [B-1] | 5.4 |  |  |  |  |
| Ex. 29 | [A-4] | 0.9 | 138 | 9.1 | AA | AA |
|  | [B-1] | 5.1 |  |  |  |  |
| Comp. Ex. 8 | [B-1] | 6.0 | 202 | 18.5 | BB | AA |

What is claimed is:

1. A preform having a neck, which preform is formed from at least one polyester selected from the group consisting of:

(ii) a polyester consisting essentially of:
   dicarboxylic acid constituent units derived from terephthalic acid or its ester derivative; and
   diol constituent units derived from diols comprising ethylene glycol and a polyalkylene glycol having an alkylene chain of 2 to 10 carbon atoms,
   wherein the proportion of constituent units derived from the polyalkylene glycol is in the range of 0.001 to 10% by weight based on the diol constituent units, and the polyalkylene glycol has a polymerization degree (n) of 5 to 50, (iii) a polyester consisting essentially of:
   dicarboxylic acid constituent units derived from terephthalic acid or its ester derivative and isophthalic acid or its ester derivative,
   diol constituent units derived from diols comprising ethylene glycol and a polyalkylene glycol having an alkylene chain of 2 to 10 carbon atoms,
   wherein the proportion of the constituent units derived from the isophthalic acid or its ester derivative is in the range of 1 to 15% by weight based on the dicarboxylic acid constituent units, and the proportion of constituent units derived from the polyalkylene glycol is in the range of 0.001 to 10% by weight based on the diol constituent units, and the polyalkylene glycol has a polymerization degree (n) of 5 to 50;

(iv) a polyester consisting essentially of:
   dicarboxylic acid constituent units derived from naphthalenedicarboxylic acid or its ester derivative,
   diol constituent units derived from diols comprising ethylene glycol and a polyalkylene glycol having an alkylene chain of 2 to 10 carbon atoms,
   wherein the proportion of constituent units derived from the polyalkylene glycol is in the range of 0.001 to 10% by weight based on the diol constituent units, and the polyalkylene glycol has a polymerization degree (n) of 5 to 50;

(v) a polyester consisting essentially of:
   dicarboxylic acid constituent units derived from naphthalenedicarboxylic acid or its ester derivative and isophthalic acid or its ester derivative,
   diol constituent units derived from diols comprising ethylene glycol and a polyalkylene glycol having an alkylene chain of 2 to 10 carbon atoms,
   wherein the proportion of the constituent units derived from the naphthalenedicarboxylic acid or its ester derivative is in the range of 99 to 55% by weight based on the dicarboxylic acid constituent units, and the proportion of constituent units derived from the polyalkylene glycol is in the range of 0.001 to 10% by weight based on the diol constituent units, and the polyalkylene glycol has a polymerization degree (n) of 5 to 50; and (vi) a polyester wherein, in any of the preceding polyesters, the polyalkylene glycol is polytetramethylene glycol having an alkylene chain of 4 carbon atoms and a polymerization degree (n) of 5 to 50, and wherein a molding made from any of polyesters (ii)–(vi) has a carbon dioxide transmission rate of 17.5 cc·mm/m$^2$·day·atm or less.

2. The preform as claimed in claim 1, wherein the polyester (ii) contains constituent units derived from dicarboxylic acids other than the terephthalic acid or its ester derivative in an amount of not more than 15% per mol.

3. The preform as claimed in claim 1, wherein the polyester has a heat up half crystallization time of 10 to 200 seconds.

4. The preform as claimed in claim 1, wherein the neck of the preform is heat crystallized at a temperature of 100 to 200° C.

5. A biaxially stretched bottle wherein the bottle is blow molded from the preform of claim 1.

6. The biaxially stretched bottle as claimed in claim 5, wherein the bottle has a body and a neck, and the body of the bottle has a carbon dioxide gas transmission rate of not more than 17.5 cc·mm/m$^2$·day·atm.

7. The biaxially stretched bottle as claimed in claim 5, wherein the bottle has a body and a neck, and the body of the bottle has a carbon dioxide gas transmission rate of not more than 15.0 cc·mm/m$^2$·day·atm.

8. The biaxially stretched bottle as claimed in claim 5, wherein the bottle has a body and a neck, and the body of the bottle has a carbon dioxide gas transmission rate of not more than 4.0 cc·mm/m$^2$·day·atm.

9. A polyester composition comprising:

(A) a polyester in an amount of 1 to 99% by weight, said polyester being at least one selected from the group consisting of (iv) a polyester consisting essentially of:
dicarboxylic acid constituent units derived from naphthalene-dicarboxylic acid or its derivative,
diol constituent units derived from diols comprising ethylene glycol and a polyalkylene glycol having an alkylene chain of 2 to 10 carbon atoms,
wherein the proportion of constituent units derived from the polyalkylene glycol is in the range of 0.001 to 10% by weight based on the diol constituent units, and the polyalkylene glycol has a polymerization degree (n) of 5 to 50;

(v) a polyester consisting essentially of:
dicarboxylic acid constituent units derived from naphthalenedicarboxylic acid or its ester derivative and isophthalic acid or its ester derivative,
diol constituent units derived from diols comprising ethylene glycol and a polyalkylene glycol having an alkylene chain of 2 to 10 carbon atoms,
wherein the proportion of the constituent units derived from the naphthalenedicarboxylic acid or its ester derivative is in the range of 99 to 55% by weight based on the dicarboxylic acid constituent units, and
the proportion of constituent units derived from the polyalkylene glycol is in the range of 0.001 to 10% by weight based on the diol constituent units, and the polyalkylene glycol has a polymerization degree (n) of 5 to 50; and (vi) a polyester wherein, in any of the preceding polyesters, the polyalkylene glycol is polytetramethylene glycol having an alkylene chain of 4 carbon atoms and a polymerization degree (n) of 5 to 50; and (B) a second polyester in an amount of 1 to 99% by weight, said second polyester comprising:
dicarboxylic acid constituent units derived from at least one dicarboxylic acid selected from the group consisting of terephthalic acid, isophthalic acid and naphthalenedicarboxylic acid, and
diol constituent units derived from diols comprising ethylene glycol and polyalkylene glycol,
wherein the proportion of constituent units derived from the polyalkylene glycol is less than 0.001% by weight based on the diol constituent units, and the polyalkylene glycol has a polymerization degree (n) of 5 to 50;

and wherein a molding made from polyester (A) and polyester (B) has a carbon dioxide transmission rate of 17.5 cc·mm/m$^2$·day·atm or less.

10. A polyester laminate having a multi-layer structure comprising:

(I) a first resin layer formed from polyester compositions or a polyester selected from the group consisting of at least one of the following polyesters (i) to (vi):

(i) a polyester consisting essentially of:
dicarboxylic acid constituent units derived from at least one dicarboxylic acid selected from the group consisting of terephthalic acid, isophthalic acid and naphthalenedicarboxylic acid, and
diol constituent units derived from diols comprising ethylene glycol and a polyalkylene glycol having an alkylene chain of 2 to 10 carbon atoms,
wherein the proportion of constituent units derived from the polyalkylene glycol is in the range of 0.001 to 10% by weight based on the diol constituent units, and the polyalkylene glycol has a polymerization degree (n) of 5 to 50, (ii) a polyester wherein, in the polyester (i), the dicarboxylic acid constituent units are derived from terephthalic acid or its ester derivative, (iii) a polyester wherein, in the polyester (i), the dicarboxylic constituent units are derived from terephthalic acid or its ester derivative and isophthalic acid or its ester derivative, and the proportion of the constituent units derived from the isophthalic acid or its ester derivative is in the range of 1 to 15% by weight based on the dicarboxylic acid constituent units;

(iv) a polyester wherein, in the polyester (i), the dicarboxylic constituent units are derived from naphthalenedicarboxylic acid or its derivative, (v) a polyester wherein, in the polyester (i), the dicarboxylic constituent units are derived from naphthalenedicarboxylic acid or its ester derivative and isophthalic acid or its ester derivative, and the proportion of the constituent units derived from the naphthalenedicarboxylic acid or its ester derivative is in the range of 99 to 55% by weight based on the dicarboxylic acid constituent units, (vi) a polyester wherein, in any of preceding polyesters, the polyalkylene glycol is polytetramethylene glycol having an alkylene chain of 4 carbon atoms and a polymerization degree (n) of 5 to 50;

and wherein said polyester compositions comprise (A) a first polyester selected from the group consisting of at least one of the polyesters (i) to (vi) in an amount of 1 to 99% by weight and (B) a second polyester in an amount of 1 to 99% by weight, said second polyester (B) comprising:
dicarboxylic acid constituent units derived from at least one dicarboxylic acid selected from the group consisting of terephthalic acid, isophthalic acid and naphthalenedicarboxylic acid, and diol constituent units derived from diols comprising ethylene glycol and polyalkylene glycol, wherein the proportion of constituent units derived from the polyalkylene glycol is less than 0.001% by weight based on the diol constituent units, and the polyalkylene glycol has a polymerization degree (n) of 5 to 50;

wherein the first resin layer (I) has a carbon dioxide transmission rate of 17.5 cc·mm/m²·day·atm or less; and (II) a second resin layer formed from at least one resin selected from the group consisting of (a) the second polyester (B), (b) a polyamide and (c) a polyolefin.

11. The polyester laminate as claimed in claim 10, in the form of a preform.

12. The polyester laminate as claimed in claim 10, in the form of a bottle having a body and a neck.

13. The polyester laminate as claimed in claim 12, wherein the body of the bottle has a carbon dioxide gas transmission rate of not more than 17.5 cc·mm/m²·day·atm.

14. The polyester laminate as claimed in claim 12, wherein the body of the bottle has a carbon dioxide gas transmission rate of not more than 15.0 cc·mm/m²·day·atm.

15. The polyester laminate as claimed in claim 12, wherein the body of the bottle has a carbon dioxide gas transmission rate of not more than 4.0 cc·mm/m²·day·atm.

16. A process for producing a biaxially stretched polyester bottle, comprising:

(1a) a step of producing a preform from a polyester selected from the group consisting of at least one of the following polyesters (i) to (vi) and polyester compositions:

(i) a polyester consisting essentially of:
dicarboxylic acid constituent units derived from at least one dicarboxylic acid selected from the group consisting of terephthalic acid, isophthalic acid and naphthalenedicarboxylic acid, and diol constituent units derived from diols comprising ethylene glycol and a polyalkylene glycol having an alkylene chain of 2 to 10 carbon atoms, wherein the proportion of constituent units derived from the polyalkylene glycol is in the range of 0.001 to 10% by weight based on the diol constituent units, and the polyalkylene glycol has a polymerization degree (n) of 5 to 50, (ii) a polyester wherein, in the polyester (i), the dicarboxylic acid constituent units are derived from terephthalic acid or its ester derivative, (iii) a polyester wherein, in the polyester (i), the dicarboxylic constituent units are derived from terephthalic acid or its ester derivative and isophthalic acid or its ester derivative, and the proportion of the constituent units derived from the isophthalic acid or its ester derivative is in the range of 1 to 15% by weight based on the dicarboxylic acid constituent units;

(iv) a polyester wherein, in the polyester (i), the dicarboxylic constituent units are derived from naphthalenedicarboxylic acid or its derivative, (v) a polyester wherein, in the polyester (i), the dicarboxylic constituent units are derived from naphthalenedicarboxylic acid or its ester derivative and isophthalic acid or its ester derivative, and the proportion of the constituent units derived from the naphthalenedicarboxylic acid or its ester derivative is in the range of 99 to 55% by weight based on the dicarboxylic acid constituent units, and (vi) a polyester wherein, in any of the preceding polyesters, the polyalkylene glycol is polytetramethylene glycol having an alkylene chain of 4 carbon atoms and a polymerization degree (n) of 5 to 50; or (1b) a step of producing polyester compositions comprising (A) a first polyester selected from the group consisting of at least one of the polyesters (i) to (vi) in an amount of 1 to 99% by weight and (B) a second polyester in an amount of 1 to 99% by weight, said second polyester (B) comprising:
dicarboxylic acid constituent units derived from at least one dicarboxylic acid selected from the group consisting of terephthalic acid, isophthalic acid and naphthalenedicarboxylic acid, and diol constituent units derived from diols comprising ethylene glycol and polyalkylene glycol, wherein the proportion of constituent units derived from the polyalkylene glycol is less than 0.001% by weight based on the diol constituent units, and the polyalkylene glycol has a polymerization degree (n) of 5 to 50; or (1c) a step of producing a laminate having a multi-layer structure comprising:

(I) a first resin layer formed from a polyester selected from the group consisting of at least one of the polyesters (i) to (vi) and the polyester compositions; and (II) a second resin layer formed from at least one resin selected from the group consisting of (a) the second polyester (B), (b) a polyamide and (c) a polyolefin, (2) a step of heating the product of step (1a), (1b) or (1c);

(3) a step of subjecting the product of step (1a), (1b), or (1c) to biaxial stretch blow molding to give a stretched bottle; and (4) a step of holding the stretched bottle in a mold at a temperature of not lower than 100° C.;
wherein the biaxially stretched polyester bottle has a carbon dioxide transmission rate of 17.5 cc·mm/m²·day·atm or less.

17. The process for producing a biaxially stretched polyester bottle as claimed in claim 16, wherein the bottle has a body and a neck, and the neck of the preform is heat-crystallized before the biaxial stretch blow molding.

18. The process for producing a biaxially stretched polyester bottle as claimed in claim 16, wherein the bottle has a body and a neck, and the neck of the preform is heat-crystallized after the biaxial stretch blow molding.

19. The process for producing a biaxially stretched polyester bottle as claimed in claim 16, wherein the bottle has a body and a neck, and the body of the resulting bottle has a carbon dioxide gas transmission rate of not more than 17.5 cc·mm/m²day·atm.

20. The process for producing a biaxially stretched polyester bottle as claimed in claim 16, wherein the bottle has a body and a neck, and the body of the resulting bottle has a carbon dioxide gas transmission rate of not more than 15.0 cc·mm/m²·day·atm.

21. The process for producing a biaxially stretched polyester bottle as claimed in claim 16, wherein the bottle has a body and a neck, and the body of the resulting bottle has a carbon dioxide gas transmission rate of not more than 4.0 cc·mm/m²·day·atm.

22. A preform having a neck, which preform is formed from a polyester selected from the group consisting of at least one of the following polyesters (viii) to (xii):

(viii) a polyester consisting essentially of:
  dicarboxylic acid constituent units derived from terephthalic acid or its ester derivative; and
  diol constituent units derived from diols consisting essentially of ethylene glycol, a polyalkylene glycol having an alkylene chain of 2 to 10 carbon atoms, and at least one other diol which is an aliphatic glycol,
  wherein the proportion of constituent units derived from the polyalkylene glycol is in the range of 0.001 to 10% by weight based on the diol constituent units, and the polyalkylene glycol has a polymerization degree (n) of 5 to 50, and
  the constituent units derived from the other diol are contained in an amount of not more than 15% per mol based on the diol constituent units, (ix) a polyester consisting essentially of:
  dicarboxylic constituent units are derived from terephthalic acid or its ester derivative and isophthalic acid or its ester derivative, and the proportion of the constituent units derived from the isophthalic acid or its ester derivative is in the range of 1 to 15% by weight based on the dicarboxylic acid constituent units, and
  diol constituent units derived from diols consisting essentially of ethylene glycol, a polyalkylene glycol having an alkylene chain of 2 to 10 carbon atoms, and at least one other diol which is an aliphatic glycol,
  wherein the proportion of constituent units derived from the polyalkylene glycol is in the range of 0.001 to 10% by weight based on the diol constituent units, and the polyalkylene glycol has a polymerization degree (n) of 5 to 50, and
  the constituent units derived from the other diol are contained in an amount of not more than 15% per mol based on the diol constituent units;

(x) a polyester consisting essentially of:
  dicarboxylic acid constituent units derived from naphthalene-dicarboxylic acid or its derivative, and
  diol constituent units derived from diols consisting essentially of ethylene glycol, a polyalkylene glycol having an alkylene chain of 2 to 10 carbon atoms, and at least one other diol which is an aliphatic glycol,
  wherein the proportion of constituent units derived from the polyalkylene glycol is in the range of 0.001 to 10% by weight based on the diol constituent units, and the polyalkylene glycol has a polymerization degree (n) of 5 to 50, and
  the constituent units derived from the other diol are contained in an amount of not more than 15% per mol based on the diol constituent units, (xi) a polyester consisting essentially of:
  dicarboxylic constituent units derived from naphthalenedicarboxylic acid or its ester derivative and isophthalic acid or its ester derivative, and the proportion of the constituent units derived from the naphthalenedicarboxylic acid or its ester derivative is in the range of 99 to 55% by weight based on the dicarboxylic acid constituent units, and
  diol constituent units derived from diols consisting essentially of ethylene glycol, a polyalkylene glycol having an alkylene chain of 2 to 10 carbon atoms, and at least one other diol which is an aliphatic glycol,
  wherein the proportion of constituent units derived from the polyalkylene glycol is in the range of 0.001 to 10% by weight based on the diol constituent units, and the polyalkylene glycol has a polymerization degree (n) of 5 to 50, and
  the constituent units derived from the other diol are contained in an amount of not more than 15% per mol based on the diol constituent units, (xii) a polyester wherein, in any of the preceding polyesters, the polyalkylene glycol is polytetramethylene glycol having an alkylene chain of 4 carbon atoms and a polymerization degree (n) of 5 to 50, and wherein a molding made from any of polyesters (viii)–(xii) has a carbon dioxide transmission rate of 17.5 cc·mm/m$^2$·day·atm or less.

23. The preform as claimed in claim 22, wherein the aliphatic glycols are diethylene glycol, triethylene glycol, tetraethylene glycol, trimethylene glycol (propanediol), butanediol, pentanediol, neopenthyl glycol, hexamethylene glycol and dodecamethylene glycol.

24. The preform as claimed in claim 22, wherein the aliphatic glycol is cyclohexanedimethanol.

25. A biaxially stretched bottle wherein the bottle is blow molded from the preform of claim 22.

26. The biaxially stretched bottle as claimed in claim 25, wherein the aliphatic glycols are diethylene glycol, triethylene glycol, tetraethylene glycol, trimethylene glycol (propanediol), butanediol, pentanediol, neopenthyl glycol, hexamethylene glycol and dodecamethylene glycol.

27. The biaxially stretched bottle as claimed in claim 25, wherein the aliphatic glycol is cyclohexanedimethanol.

28. A polyester composition comprising:
  (A) at least one polyester selected from the group consisting of:
    (x) a polyester consisting essentially of:
      dicarboxylic acid constituent units derived from naphthalene-dicarboxylic acid or its derivative, and
      diol constituent units derived from diols consisting essentially of ethylene glycol, a polyalkylene glycol having an alkylene chain of 2 to 10 carbon atoms, and at least one other diol which is an aliphatic glycol,
      wherein the proportion of constituent units derived from the polyalkylene glycol is in the range of 0.001 to 10% by weight based on the diol constituent units, and the polyalkylene glycol has a polymerization degree (n) of 5 to 50, and
      the constituent units derived from the other diol are contained in an amount of not more than 15% per mol based on the diol constituent units,
    (xi) a polyester consisting essentially of:
      dicarboxylic constituent units derived from naphthalenedicarboxylic acid or its ester derivative and isophthalic acid or its ester derivative, and the proportion of the constituent units derived from the naphthalenedicarboxylic acid or its ester derivative is in the range of 99 to 55% by weight based on the dicarboxylic acid constituent units, and
      diol constituent units derived from diols consisting essentially of ethylene glycol, a polyalkylene glycol having an alkylene chain of 2 to 10 carbon atoms, and at least one other diol which is an aliphatic glycol,
      wherein the proportion of constituent units derived from the polyalkylene glycol is in the range of 0.001 to 10% by weight based on the diol constituent units, and the polyalkylene glycol has a polymerization degree (n) of 5 to 50, and the constituent units derived from the other diol are contained in an amount of not more than 15% per mol based on the dial constituent units, (xii) a polyester wherein, in any of the preceding polyesters, the polyalkylene glycol is polytetramethylene glycol having an alkylene chain of 4 carbon atoms and a polymerization degree (n) of 5 to 50; and (B) an additional polyester in an amount of 1 to 99% by weight, said additional polyester comprising:
  dicarboxylic acid constituent units derived from at least one dicarboxylic acid selected from the group consisting of terephthalic acid, isophthalic acid and naphthalenedicarboxylic acid, and
  diol constituent units derived from diols comprising ethylene glycol and polyalkylene glycol, wherein the proportion of constituent units derived from the polyalkylene glycol is less than 0.001% by weight based on the diol constituent units, and
  the polyalkylene glycol has a polymerization degree (n) of 5 to 50;
and wherein a molding made from polyester (A) and polyester (B) has a carbon dioxide transmission rate of 17.5 cc·mm/m$^2$·day·atm or less.

29. The polyester composition as claimed in claim 28, wherein the aliphatic glycols are diethylene glycol, triethylene glycol, tetraethylene glycol, trimethylene glycol (propanediol), butanediol, pentanediol, neopenthyl glycol, hexamethylene glycol and dodecamethylene glycol.

30. The polyester composition as claimed in claim 29, wherein the aliphatic glycol is cyclohexanedimethanol.

31. A polyester laminate having a multi-layer structure comprising resin layers (I) and (II), wherein
(I) a first resin layer formed from a polymer composition or a polyester selected from the group consisting of at least one of the following polyesters (vii) to (xii):
  (vii) a polyester consisting essentially of:
    dicarboxylic acid constituent units derived from at least one dicarboxylic acid selected from the group consisting of terephthalic acid, isophthalic acid and naphthalenedicarboxylic acid, and
    diol constituent units derived from diols consisting essentially of ethylene glycol, a polyalkylene glycol having an alkylene chain of 2 to 10 carbon atoms, and at least one other diol which is an aliphatic glycol,
    wherein the proportion of constituent units derived from the polyalkylene glycol is in the range of 0.001 to 10% by weight based on the diol constituent units, and the polyalkylene glycol has a polymerization degree (n) of 5 to 50, and
    the constituent units derived from the other diol are contained in an amount of not more than 15% per mol based on the diol constituent units,
  (viii) a polyester wherein, in the polyester (vii), the dicarboxylic acid constituent units are derived from terephthalic acid or its ester derivative,
  (ix) a polyester wherein, in the polyester (vii), the dicarboxylic constituent units are derived from terephthalic acid or its ester derivative and isophthalic acid or its ester derivative, and the proportion of the constituent units derived from the isophthalic acid or its ester derivative is in the range of 1 to 15% by weight based on the dicarboxylic acid constituent units;
  (x) a polyester wherein, in the polyester (vii), the dicarboxylic constituent units are derived from naphthalenedicarboxylic acid or its derivative,
  (xi) a polyester wherein, in the polyester (vii), the dicarboxylic constituent units are derived from naphthalenedicarboxylic acid or its ester derivative and isophthalic acid or its ester derivative, and the proportion of the constituent units derived from the naphthalenedicarboxylic acid or its ester derivative is in the range of 99 to 55% by weight based on the dicarboxylic acid constituent units,
  (xii) a polyester wherein, in any of the preceding polyesters, the polyalkylene glycol is polytetramethylene glycol having an alkylene chain of 4 carbon atoms and a polymerization degree (n) of 5 to 50;
wherein said polymer compositions comprise (A) a first polyester selected from the group consisting of at least one of the polyesters (vii) to (xii) in an amount of 1 to 99% by weight and (B) a second polyester in an amount of 1 to 99% by weight,
said second polyester (B) comprising:
  dicarboxylic acid constituent units derived from at least one dicarboxylic acid selected from the group consisting of terephthalic acid, isophthalic acid and naphthalenedicarboxylic acid, and diol constituent units derived from diols comprising ethylene glycol and polyalkylene glycol,
  wherein the proportion of constituent units derived from the polyalkylene glycol is less than 0.001% by weight based on the diol constituent units, and the polyalkylene glycol has a polymerization degree (n) of 5 to 50;
and wherein the resin layer (I) made from polyester (A) and polyester (B) has a carbon dioxide transmission rate of 17.5 cc·mm/m$^2$·day·atm or less; and (II) a second resin layer formed from at least one resin selected from the group consisting of (a) the second polyester (B), (b) a polyamide and (c) a polyolefin.

32. The polyester laminate as claimed in claim 31, wherein the aliphatic glycols are diethylene glycol, triethylene glycol, tetraethylene glycol, trimethylene glycol (propanediol), butanediol, pentanediol, neopenthyl glycol, hexamethylene glycol and dodecamethylene glycol.

33. A process for producing a biaxially stretched polyester bottle, comprising:
(1a) a step of producing a preform formed. from a polyester selected from the group consisting of at least one of the following polyesters (vii) to (xii):
  (vii) a polyester consisting essentially of:
    dicarboxylic acid constituent units derived from at least one dicarboxylic acid selected from the group consisting of terephthalic acid, isophthalic acid and naphthalenedicarboxylic acid, and
    diol constituent units derived from diols consisting essentially of ethylene glycol, a polyalkylene glycol having an alkylene chain of 2 to 10 carbon atoms, and at least one other diol which is an aliphatic glycol,
    wherein the proportion of constituent units derived from the polyalkylene glycol is in the range of 0.001 to 10% by weight based on the diol constituent units, and the polyalkylene glycol has a polymerization degree (n) of 5 to 50, and
    the constituent units derived from the other diol are contained in an amount of not more than 15% per mol based on the diol constituent units,
  (viii) a polyester wherein, in the polyester (vii), the dicarboxylic acid constituent units are derived from terephthalic acid or its ester derivative,
  (ix) a polyester wherein, in the polyester (vii), the dicarboxylic constituent units are derived from terephthalic acid or its ester derivative and isophthalic acid or its ester derivative, and the proportion of the constituent units derived from the isophthalic acid or its ester derivative is in the range of 1 to 15% by weight based on the dicarboxylic acid constituent units;

(x) a polyester wherein, in the polyester (vii), the dicarboxylic constituent units are derived from naphthalenedicarboxylic acid or its derivative, (xi) a polyester wherein, in the polyester (vii), the dicarboxylic constituent units are derived from naphthalenedicarboxylic acid or its ester derivative and isophthalic acid or its ester derivative, and the proportion of the constituent units derived from the naphthalenedicarboxylic acid or its ester derivative is in the range of 99 to 55% by weight based on the dicarboxylic acid constituent units, (xii) a polyester wherein, in any of the preceding polyesters, the polyalkylene glycol is polytetramethylene glycol having an alkylene chain of 4 carbon atoms and a polymerization degree (n) of 5 to 50; or (1b) a step of producing polyester compositions comprising (A) a first polyester selected from the group consisting of at least one of the polyesters (vii) to (xii) in an amount of 1 to 99% by weight and (B) a second polyester in an amount of 1 to 99% by weight, said second polyester comprising:

dicarboxylic acid constituent units derived from at least one dicarboxylic acid selected from the group consisting of terephthalic acid, isophthalic acid and naphthalenedicarboxylic acid, and diol constituent units derived from diols comprising ethylene glycol and polyalkylene glycol, wherein the proportion of constituent units derived from the polyalkylene glycol is less than 0.001% by weight based on the diol constituent units, and the polyalkylene glycol has a polymerization degree (n) of 5 to 50; or (1c) a step of producing a laminate having a multi-layer structure comprising:

(I) a first resin layer formed from a polyester selected from the group consisting of at least one of the polyesters (vii) to (xii) and the polyester compositions; and (II) a second resin layer formed from at least one resin selected from the group consisting of (a) the second polyester (B), (b) a polyamide and (c) a polyolefin;

(2) a step of heating the product of step (1a), (1b) or (1c), (3) a step of subjecting the product of step (1a), (1b) or (1c) to biaxial stretch (4) a step of blow molding to give a stretched bottle, and (5) a step of holding the stretched bottle in a mold at a temperature of not lower than 100° C.;

and wherein the biaxially stretched polyester bottle has a carbon dioxide transmission rate of 17.5 cc·mm/m²·day·atm or less.

34. The process as claimed in claim 33, wherein the aliphatic glycols are diethylene glycol, triethylene glycol, tetraethylene glycol, trimethylene glycol (propanediol), butanediol, pentanediol, neopenthyl glycol, hexamethylene glycol and dodecamethylene glycol.

35. The process as claimed in claim 34, wherein the aliphatic glycol is cyclohexanedimethanol.

36. The preform as claimed in claim 1, wherein the polyalkylene glycol has a polymerization degree of 10 to 50.

* * * * *